US011646939B2

(12) United States Patent
Ma et al.

(10) Patent No.: US 11,646,939 B2
(45) Date of Patent: May 9, 2023

(54) NETWORK FUNCTION NF MANAGEMENT METHOD AND NF MANAGEMENT DEVICE

(71) Applicant: HUAWEI TECHNOLOGIES CO., LTD., Guangdong (CN)

(72) Inventors: Jingwang Ma, Shanghai (CN); Heng Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/355,401

(22) Filed: Jun. 23, 2021

(65) Prior Publication Data
US 2021/0320845 A1 Oct. 14, 2021

Related U.S. Application Data

(63) Continuation of application No. 16/262,004, filed on Jan. 30, 2019, now Pat. No. 11,070,433, which is a
(Continued)

(51) Int. Cl.
*H04L 12/24* (2006.01)
*H04L 41/0893* (2022.01)
(Continued)

(52) U.S. Cl.
CPC ...... *H04L 41/0893* (2013.01); *H04L 41/0806* (2013.01); *H04L 41/12* (2013.01); *H04L 12/66* (2013.01); *H04L 67/10* (2013.01)

(58) Field of Classification Search
CPC . H04L 41/0893; H04L 41/0806; H04L 41/12; H04L 12/66; H04L 67/10;
(Continued)

(56) References Cited

U.S. PATENT DOCUMENTS 7,088,995 B2    8/2006 Rao
10,448,320 B2 * 10/2019 Vrzic ................ H04W 76/00
(Continued)

FOREIGN PATENT DOCUMENTS

CN        1860451 A      11/2006
CN        102271053 A    12/2011
(Continued)

OTHER PUBLICATIONS

3GPP TSG SA WG2 Meeting #116, S2-164161, Huawei et al: "NF Discovery across PLMN", Jul. 2016, 6 pages. XP51121807.
(Continued)

*Primary Examiner* — Hoang-Chuong Q Vu
(74) *Attorney, Agent, or Firm* — Huawei Technologies Co., Ltd.

(57) ABSTRACT

In a network function (NF) management method, a NF management device receives an NF discovery request sent by a first NF component, where the NF discovery request includes a second NF identifier that indicates a second NF. The NF management device obtains component information of a second NF component based on the second NF identifier, where the second NF component has the second NF, and the component information includes a discovery policy of the second NF component and a second NF component identifier. The NF management device determines, based on the discovery policy in the component information, that the first NF component can access the second NF component, and sends the second NF component identifier to the first NF component.

17 Claims, 8 Drawing Sheets

Related U.S. Application Data continuation of application No. PCT/CN2017/093941, filed on Jul. 21, 2017.

(51) Int. Cl.

| | | |
|---|---|---|
| *H04L 41/12* | (2022.01) | |
| *H04L 41/0806* | (2022.01) | |
| H04L 12/66 | (2006.01) | |
| H04L 67/10 | (2022.01) | |

(58) Field of Classification Search
CPC ......... H04L 67/16; H04L 12/00; H04L 45/02; H04L 12/46; H04W 48/18; H04W 12/08; H04W 12/06; H04W 80/10; G06F 16/245
See application file for complete search history.

(56) References Cited

U.S. PATENT DOCUMENTS

| | | | |
|---|---|---|---|
| 10,667,202 | B2 | 5/2020 | Sirotkin et al. |
| 2005/0086502 | A1 | 4/2005 | Rayes et al. |
| 2007/0286126 | A1 | 12/2007 | Prakash et al. |
| 2007/0286151 | A1 | 12/2007 | Prakash et al. |
| 2011/0188403 | A1 | 8/2011 | Calippe et al. |
| 2012/0014332 | A1 | 1/2012 | Smith et al. |
| 2014/0092886 | A1 | 4/2014 | Gupta |
| 2015/0092553 | A1 | 4/2015 | Sirotkin et al. |
| 2015/0358248 | A1 | 12/2015 | Saha et al. |
| 2016/0006619 | A1 | 1/2016 | Maity et al. |
| 2016/0219076 | A1 | 7/2016 | Paczkowski et al. |
| 2016/0227044 | A1 | 8/2016 | Livanos et al. |
| 2016/0234082 | A1 | 8/2016 | Xia et al. |
| 2016/0234828 | A1 | 8/2016 | Smith et al. |
| 2016/0345334 | A1 | 11/2016 | Veerepalli et al. |
| 2017/0142591 | A1* | 5/2017 | Vrzic .................... H04W 24/02 |
| 2017/0332226 | A1* | 11/2017 | Bharatia ............... H04W 76/10 |
| 2017/0332421 | A1* | 11/2017 | Sternberg ............. H04W 76/11 |
| 2017/0367026 | A1 | 12/2017 | Li et al. |
| 2017/0367036 | A1 | 12/2017 | Chen et al. |
| 2018/0041904 | A1 | 2/2018 | Shimojou et al. |
| 2018/0176858 | A1* | 6/2018 | Wang .................... H04W 48/18 |
| 2018/0249530 | A1 | 8/2018 | Salkintzis |
| 2018/0352501 | A1* | 12/2018 | Zhang .................. H04W 48/18 |
| 2018/0368140 | A1* | 12/2018 | Centonza .......... H04W 72/0426 |
| 2019/0021064 | A1 | 1/2019 | Ryu et al. |
| 2019/0037409 | A1 | 1/2019 | Wang et al. |
| 2019/0104455 | A1* | 4/2019 | Park ....................... H04W 76/20 |
| 2019/0104461 | A1* | 4/2019 | Yi ........................... H04W 40/02 |
| 2019/0140972 | A1 | 5/2019 | Xu et al. |
| 2019/0364541 | A1 | 11/2019 | Ryu |
| 2021/0297938 | A1* | 9/2021 | Morper ................. H04W 48/18 |

FOREIGN PATENT DOCUMENTS

| | | |
|---|---|---|
| CN | 103067245 A | 4/2013 |
| CN | 104104534 A | 10/2014 |
| CN | 104468162 A | 3/2015 |
| CN | 104579732 A | 4/2015 |
| CN | 105103581 A | 11/2015 |
| CN | 105262664 A | 1/2016 |
| EP | 2750328 A1 | 7/2014 |
| JP | 2013518521 A | 5/2013 |
| RU | 2420008 C2 | 5/2011 |
| RU | 2420903 C2 | 6/2011 |
| WO | 2015126430 A1 | 8/2015 |
| WO | 2016152588 A1 | 9/2016 |

OTHER PUBLICATIONS

Wolfgang John et al. "Update on Split Architecture for Large Scale Wide Area Networks, SPARC ICT-258457 D3.2",93 pages. XP55070646.
Huawei Tech (UK) Co et al: "Network Virtualization scenarios", ETSI Draft; NGP(16)000063R1, Jun. 15, 2016, pp. 1-11, XP14275643.
Huawei, HiSilicon,"Solution: The discovery of NFs",3GPP TSG SA WG2 Meeting #113AH S2-161019,Feb. 23-26, 2016, Sophia Antipolis, France (revision of S2-16xxxx),total 5 pages.
ATandT et al.,"New Key Issue: Modular Logical Functions in the NextGen System",SA WG2 Meeting #113 52-16075422,Jan. 25-29, 2016, Saint Kitts, KN (revision of S2-160722670),total 3 pages.
3GPP TR 23.799 V0 6.0 (Jul. 2016);3rd Generation Partnership Project;Technical Specification Group Services and System Aspects;Study on Architecture for Next Generation System(Release 14),total 321 pages.
Huawei, HiSilicon, China Mobile,"NF Discovery across PLMN",3GPP TSG SA WG2 Meeting #116 S2-164161 (revision of S2-163549),11 Jul. 15, 2016, Vienna, Austria,total 6 pages.

* cited by examiner

NETWORK FUNCTION NF MANAGEMENT METHOD AND NF MANAGEMENT DEVICE

CROSS-REFERENCE TO RELATED APPLICATIONS

This application is a continuation of U.S. patent application Ser. No. 16/262,004, filed on Jan. 30, 2019, which is a continuation of International Application No. PCT/CN2017/093941, filed on Jul. 21, 2017, which claims priority to International Application No. PCT/CN2016/092723, filed on Aug. 1, 2016, The disclosures of the aforementioned applications are hereby incorporated by reference in their entireties.

TECHNICAL FIELD

This application relates to the communications field, and specifically, to an NF management method and an NF management device.

BACKGROUND

Currently, an architecture of a network element (Network Element, NE) is used in an evolved packet core (Evolved Packet Core, EPC). The architecture includes typical NEs such as a mobility management entity (Mobility Management Entity, MME), a serving gateway (Serving Gateway, S-GW), and a packet data network gateway (Packet Data Network Gateway, P-GW). Current network functions (for example, mobility management, bearer management, and location management) of the EPC are implemented by using a solidified service feature and processing logic of the NE, and a procedure message between NEs. For example, an access service of a user needs to be implemented through standardized service procedure logic and collaboration between the MME, the S-GW, the P-GW, and another NE in a network (for example, a policy and charging rules function (Policy and Charging Rules Function, PCRF) unit and a home subscriber server (Home Subscriber Server, HSS)). Therefore, the current network function (Network Function, NF) provided by the EPC has a solidified service feature.

With continuous expansion of a business model and continuous development of technologies, a service requirement of the user changes. A user service requires more service modes and a better service feature, for example, ultra-low latency communication and high-reliability communication, and therefore a new NF requirement is imposed. However, NF services provided by the EPC are solidified and distributed in all NEs. Therefore, if a new NF needs to be introduced to support a user requirement, processing logic and procedure interaction of the NE needs to be redefined and redesigned in the EPC. For an equipment vendor, this redesign means a long development cycle and high costs, and for a network operator, this redesign means that a new network service cannot be released in time.

To resolve the foregoing problems, an existing NF management method is as follows: As shown in FIG. 1, a network architecture includes N UEs. The UEs accesses a core network by using a radio access network node (RAN node), and obtains N network slices (slice) through segmentation on a common network infrastructure of the core network based on a virtualization technology and the like. The network slice may also be referred to as a dedicated network, and the dedicated network is used to implement a network service required by one or more services. A service oriented architecture (Service oriented architecture) may be used in the network slice. NEs (such as an MME and an S-GW) in an original network architecture are defined as different NFs based on function types, for example, an authentication and security function, a packet data session management function, a mobility management function, an access control function, and a policy control function. These functions are implemented by corresponding NF components. Each NF component serves another NF component or function by using a defined service interface. In an architecture shown in FIG. 2, a plurality of network slices (a slice A, a slice B, and a slice C) of a same operator use a same public land mobile network (Public Land Mobile Network, PLMN), and may be deployed in an infrastructure of the operator by using a cloud technology, a virtualization technology, and the like. The infrastructure of the operator includes cloud computing and transmission infrastructures of the operator. In FIG. 2, the slice A includes NF components NF 1 and NF 2, the slice B includes an NF 4 and an NF 5, the slice A and the slice B share an NF 3, the slice C includes an NF 6 and an NF 7, and the NF 3 and the NF 7 have a same NF. When user equipment needs to perform a user service, the user equipment accesses one network slice by using a network node (a node 1, a node 2, or a node 3). Functions supported by different NF components need to be decoupled as much as possible. To be specific, the functions of the different NF components are different as much as possible. An NF component can discover and access a function of another NF component. For example, a network service required by a user service is to first execute a function of the NF 1, and execute a function of the NF 3 when the function of the NF 1 is executed. In FIG. 2, the NF 1 discovers and accesses the NF 3 shared by the network slice A and the network slice B, and can also discover and access the NF 7 in the network slice C.

However, access between NF components is limited in the core network. For example, to avoid affecting another network slice when a network slice is faulty, the operator has a function isolation requirement on the network slice. Based on the network slice isolation requirement, access between NF components deployed on the infrastructure of the operator needs to be controlled. To be specific, it is required that an NF component in a network slice can access only an NF component in the network slice or an NF component shared with the network slice. The NF 1 in the network slice A in FIG. 2 can discover and access an NF component that has a same NF as the NF 3 in any network slice. For example, the NF 1 and the NF 7 in the network slice C are not in a same network slice, and this is against with the network slice isolation requirement of the operator. All NF components that has a same NF can be discovered and accessed. Consequently, an NF component is accessed without complying with a network rule, and a normal network operation is affected. For example, the network slice isolation requirement of the operator is denied.

SUMMARY

This application provides an NF management method and an NF management device, to manage discovery and access between NF components, thereby facilitating a normal network operation.

A first aspect of this application provides an NF management method, including:

receiving an NF discovery request sent by a first NF component, where the NF discovery request includes a second NF identifier, and the second NF identifier is used to indicate a second NF;

obtaining component information of a second NF component based on the second NF identifier, where the second NF component has the second NF, and the component information includes a discovery policy of the second NF component and a second NF component identifier;

determining, based on the discovery policy in the component information, whether the first NF component can access the second NF component; and if yes, sending the second NF component identifier to the first NF component.

Component information of a NF component configured in a network slice in a core network is stored in an NF management device. If a network service required by a user service initiated by user equipment is processed by the first NF component, in a process of executing a first NF of the first NF component, the first NF component needs to access a component that has the second NF, to execute the second NF. The first NF component adds the second NF identifier to the NF discovery request, and sends the NF discovery request to the NF management device. The NF management device receives the NF discovery request of the first NF component; obtains the stored component information of the second NF component based on the second NF identifier in the NF discovery request; determines, based on the discovery policy in the component information, whether the first NF component can access the second NF component; and sends the second NF component identifier to the first NF component if the first NF component can access the second NF component, so that the first NF component can access the second NF component based on the second NF component identifier, and execute the second NF to complete the user service. Because the discovery policy is preset according to a network rule, access of the first NF component to the second NF component complies with the network rule. In comparison with the prior art in which access between NF components may not comply with the network rule, access between all NF components complies with the network rule, thereby facilitating a normal network operation.

With reference to the first aspect of this application, in a first implementation of the first aspect of this application, the obtaining component information of a second NF component based on the second NF identifier includes:

obtaining the second NF identifier from the NF discovery request; and obtaining the component information of the second NF component from a local component information base based on the second NF identifier, where the component information of the second NF component includes the second NF component identifier.

In the prior art, a skilled person defines, as different NFs based on function types, functions that need to be supported in a network. An NF component can support an NF and is configured in a network slice. Component information of each deployed NF component is stored in the local component information base of the NF management device. Because component information of all NF components is stored in the local component information base, the corresponding second NF component identifier may be retrieved from the component information base based on the second NF identifier. The second NF identifier indicates that an NF component has the second NF. There may be a plurality of NF components that have the second NF in an entire network. Therefore, a plurality of second NF components may be determined based on the retrieved second NF component identifier. The component information of the second NF component is extracted after the second NF component is determined, and each second NF component has a respective discovery policy. This facilitates centralized NF component management by the NF management device.

With reference to the first implementation of the first aspect of this application, in a second implementation of the first aspect of this application, the NF discovery request further includes an expected network slice identifier, the expected network slice identifier indicates a network slice that is discovered by the first NF component through expected requesting and in which an NF component that has the second NF is located, the component information further includes a network slice identifier of the second NF component, and the network slice identifier of the second NF component indicates a network slice in which the second NF component is located; and the obtaining the component information of the second NF component from a local component information base based on the second NF identifier includes:

obtaining the component information of the second NF component from the local component information base based on the second NF identifier and the expected network slice identifier, where the component information of the second NF component includes the second NF component identifier and the network slice identifier.

If the first NF component expectantly discovers and accesses an NF component that has the second NF in a network slice, the NF discovery request sent by the first NF component further needs to include the expected network slice identifier. The NF management device discovers all second NF components, and obtains the component information of the second NF component from the local component information base. Even if the first NF component expectantly discovers and accesses the second NF component in a network slice, the NF management device needs to determine a discoverable network slice of the second NF component in the network slice based on the discovery policy. If a network slice in which the first NF component is located is in the discoverable network slice, a requirement of the first NF component is met, and the discovery policy is observed.

With reference to the second implementation of the first aspect of this application, in a third implementation of the first aspect of this application, the discovery policy includes:

the second NF component can be accessed only by an NF component in a same network slice as the second NF component; or the second NF component can be accessed only by an NF component in a specified network slice; or the second NF component can be accessed by NF components in all network slices.

A discovery policy of an NF component is preset according to the network rule. For example, in one case, the second NF component can be accessed only by the NF components in the same network slice based on a network slice isolation requirement. In another case, the second NF component can be accessed by the NF component in the specified network slice. In still another case, the second NF component can be accessed by the NF components in all the network slices without any limitation. The three cases are merely examples for description. There may be another case in actual application, and this is not specifically limited.

With reference to the third implementation of the first aspect of this application, in a fourth implementation of the first aspect of this application, the NF discovery request further includes a network slice identifier of the first NF component; and the determining, based on the discovery policy in the component information, whether the first NF component can access the second NF component includes:

determining a discoverable network slice of the second NF component based on the discovery policy and the network slice identifier of the second NF component;

determining, based on the network slice identifier of the first NF component, whether a network slice in which the first NF component is located is in the discoverable network slice; and if yes, determining that the first NF component can access the second NF component.

If the discovery policy of the second NF component is set based on the network slice isolation requirement, the NF discovery request sent by the first NF component further needs to include the network slice identifier (for example, a slice 1) of the first NF component, or the NF management device may obtain, based on a component identifier of the first NF component and component information of the first NF component stored by the NF management device, the network slice identifier of the network slice in which the first NF component is located. The NF management device obtains a discovery policy and a network slice identifier of each second NF component from component information of each second NF component. It is assumed that a discovery policy of a second NF component NF 1 allows only access of NF components in a same network slice, and a network slice identifier is the slice 1; a discovery policy of a second NF component NF 2 allows only access of NF components in a same network slice or a shared network slice (a shared network slice identifier is a slice 3), and a network slice identifier is a slice 2. The NF management device determines, based on the discovery policy and the network slice identifier of the NF 1, that a discoverable network slice of the NF 1 is the slice 1. Likewise, discoverable network slices of the NF 2 are the slice 2 and the slice 3. It is determined, based on the network slice identifier (slice 1) of the first NF component, that the network slice in which the first NF component is located is in the discoverable network slice of the NF 1, and it is determined that the NF 1 is a target NF component. In addition, it is determined, based on the network slice identifier (slice 1) of the first NF component, that the network slice in which the first NF component is located is not in the discoverable network slices of the NF 2, and it is determined that the NF 2 is not a target NF component. The target NF component is determined from second NF components that have a same NF based on the discovery policy. In addition, because the discovery policy is set according to the network rule, the determined target NF component certainly complies with the network rule, thereby filtering an NF component that is in the second NF components and whose access by the first NF component does not comply with the network rule.

With reference to the first aspect of this application, in a fifth implementation of the first aspect of this application, the sending the second NF component identifier to the first NF component includes:

generating a component discovery response based on the second NF component identifier, and sending the component discovery response to the first NF component.

For the NF discovery request of the first NF component, the NF management device adds the second NF component identifier to the component discovery response, and feeds back the component discovery response to the first NF component. The second NF component identifier may be a component address, a component ID, or the like of the second NF component, and may be used to identify the second NF component.

With reference to any one of the first aspect, or the first to the fifth implementations of the first aspect of this application, in a sixth implementation of the first aspect of this application, the method further includes:

when a new NF component is deployed, obtaining component information of the newly deployed NF component, where the component information of the newly deployed NF component includes a component identifier, an NF identifier, a discovery policy, and a network slice identifier of the newly deployed NF component; and storing the component information of the newly deployed NF component in the local component information base.

In the prior art, a skilled person defines, as different NFs based on function types, functions that need to be supported in a network. An NF component supports an NF and is configured in a network slice. When the new NF component is deployed, the component information of the newly deployed NF component needs to be sent to the NF management device. The component information includes a component address (for example, an IP address), the component identifier, the NF identifier, the discovery policy, and the network slice identifier of the newly deployed NF component. The component identifier is a unique identifier of the newly deployed NF component. The NF identifier indicates an NF type of the newly deployed NF component. The NF type may include an authentication and security function, a bearer management function, a mobility management function, an access control function, or the like. The discovery policy is a discovery condition that is of the newly deployed NF component and that is set by a skilled person according to the network rule. For example, the discovery policy allows only access of NF components in a same network slice, or allows only access of an NF component in a specified network slice. The network slice identifier indicates a network slice in which the newly deployed NF component is located. The NF management device obtains the component information of the newly deployed NF component, and stores the component information in the component information base. To better implement NF component management, the NF management device needs to store component information of newly deployed NF components in all network slices.

A second aspect of this application provides an NF management method, including:

receiving an NF discovery request sent by a first NF component, where the NF discovery request includes a second NF identifier;

obtaining a discovery policy of a second NF based on the second NF identifier;

obtaining identifiers of one or more second NF components if the discovery policy of the second NF allows the first NF component to access the second NF, where the second NF component has the second NF; and sending the identifiers of the one or more second NF components to the first NF component.

Component information of an NF component configured in a network slice in a core network is stored in an NF management device. If a network service required by a user service initiated by user equipment is processed by the first NF component, in a process of executing a first NF of the first NF component, the first NF component needs to access a component that has the second NF, to execute the second NF. The first NF component adds the second NF identifier to the NF discovery request, and sends the NF discovery request to the NF management device. The NF management device receives the NF discovery request of the first NF component; obtains the discovery policy of the second NF component based on the second NF identifier in the NF discovery request; obtains the identifiers of the one or more second NF components if the discovery policy of the second NF allows the first NF component to access the second NF, where the second NF component has the second NF; and sends the identifiers of the one or more second NF components to the first NF component, so that the first NF component can access the second NF component based on the second NF component identifier, and execute the second NF to complete the user service. Because the discovery policy of the second NF component is preset according to a network rule, access of the first NF component to the second NF component complies with the network rule. In comparison with the prior art in which access between NF components may not comply with the network rule, access between all NF components complies with the network rule, thereby facilitating a normal network operation.

With reference to the second aspect of this application, in a first implementation of the second aspect of this application, the obtaining identifiers of one or more second NF components includes:

obtaining component information of the one or more second NF components, where the component information of the second NF component includes the identifier of the second NF component; and obtaining the identifiers of the one or more second NF components from the component information of the one or more second NF components.

In the prior art, a skilled person defines, as different NFs based on function types, functions that need to be supported in a network. An NF component can support an NF and is configured in a network slice. Component information of each deployed NF component is stored in a local component information base of the NF management device. The component information of the one or more second NF components is obtained. The component information of the second NF component includes the identifier of the second NF component, so that the identifiers of the one or more second NF components can be obtained from the component information of the one or more second NF components, thereby facilitating centralized NF component management by the NF management device.

With reference to the second aspect or the first implementation of the second aspect of this application, in a second implementation of the second aspect of this application, the NF discovery request further includes an identifier of an expected network slice, and the obtaining a discovery policy of a second NF based on the second NF identifier includes: obtaining the discovery policy of the second NF based on the second NF identifier and the identifier of the expected network slice; and the obtaining component information of the one or more second NF components includes:

obtaining the identifiers of the one or more second NF components in the expected network slice based on the second NF identifier and the identifier of the expected network slice.

If the first NF component expectantly discovers and accesses an NF component that has the second NF in a network slice, the NF discovery request sent by the first NF component further needs to include the identifier of the expected network slice. After the discovery policy of the second NF is obtained based on the second NF identifier and the identifier of the expected network slice, if the discovery policy of the second NF allows the first NF component to access the second NF, the identifiers of the one or more second NF components in the expected network slice are obtained based on the second NF identifier and the identifier of the expected network slice.

With reference to the second aspect or the first implementation of the second aspect of this application, in a third implementation of the second aspect of this application, the NF discovery request further includes an identifier of an NF group, and the obtaining a discovery policy of a second NF based on the second NF identifier includes: obtaining the discovery policy of the second NF based on the second NF identifier and the identifier of the NF group; and the obtaining component information of the one or more second NF components includes:

obtaining the identifiers of the one or more second NF components in the NF group based on the second NF identifier and the identifier of the NF group.

If the first NF component expectantly discovers and accesses an NF component that has the second NF in an NF group, the NF discovery request sent by the first NF component further needs to include the identifier of the NF group. After the discovery policy of the second NF is obtained based on the second NF identifier and the identifier of the NF group, if the discovery policy of the second NF allows the first NF component to access the second NF, the identifiers of the one or more second NF components in the NF group are obtained based on the second NF identifier and the identifier of the NF group.

With reference to the second aspect or the first implementation of the second aspect of this application, in a fourth implementation of the second aspect of tis application, the discovery policy of the second NF further includes an identifier of an NF and an identifier of a service that can be accessed by the NF; and the method further includes:

learning, based on the NF discovery request sent by the first NF component, an identifier of an NF of the first NF component;

querying the identifier of the NF and the identifier of the service that can be accessed by the NF, to determine an identifier of a service that can be accessed by the first NF component; and sending, to the first NF component, the identifier of the service that can be accessed by the first NF component.

With reference to any one of the second aspect, or the first to the fourth implementations of the second aspect of this application, in a fifth implementation of the second aspect of this application, the component information includes a component identifier and an NF identifier.

With reference to the fifth implementation of the second aspect of this application, in a sixth implementation of the second aspect of this application, the component information may further include at least one of a component address, a network slice identifier, and a group identifier.

With reference to any one of the second aspect, or the first to the sixth implementations of the second aspect of this application, in a seventh implementation of the second aspect of this application, the discovery policy includes:

the second NF can be accessed only by NF components in a same network slice; or the second NF can be accessed only by an NF component in a specified network slice; or the second NF can be accessed by NF components in all network slices.

A third aspect of this application provides an NF management device, including:

a receiving module, configured to receive an NF discovery request sent by a first NF component, where the NF discovery request includes a second NF identifier, and the second NF identifier is used to indicate a second NF;

a processing module, configured to obtain component information of a second NF component based on the second NF identifier, where the second NF component has the second NF, and the component information includes a discovery policy of the second NF component and a second NF component identifier; where the processing module is further configured to determine, based on the discovery policy in the component information, whether the first NF component can access the second NF component; and a sending module, configured to send the second NF component identifier to the first NF component when the first NF component can access the second NF component.

Component information of each NF component configured in a network slice in a core network is stored in the NF management device. If a network service required by a user service initiated by user equipment is processed by the first NF component, in a process of executing a first NF of the first NF component, the first NF component needs to access a component that has the second NF, to execute the second NF. The first NF component adds the second NF identifier to the NF discovery request, and sends the NF discovery request to the NF management device. The receiving module receives the NF discovery request of the first NF component. The processing module obtains the stored component information of the second NF component based on the second NF identifier in the NF discovery request, and determines, based on the discovery policy in the component information, whether the first NF component can access the second NF component. The sending module sends the second NF component identifier to the first NF component if the first NF component can access the second NF component, so that the first NF component can access the second NF component based on the second NF component identifier, and execute the second NF to complete the user service. Because the discovery policy is preset according to a network rule, access of the first NF component to the second NF component complies with the network rule. In comparison with the prior art in which access between NF components may not comply with the network rule, access between all NF components complies with the network rule, thereby facilitating a normal network operation.

With reference to the third aspect of this application, in a first implementation of the third aspect of this application, the processing module is further configured to obtain the second NF identifier from the NF discovery request; and the processing module is further configured to obtain the component information of the second NF component from a local component information base based on the second NF identifier, where the component information of the second NF component includes the discovery policy and the second NF component identifier.

In the prior art, a skilled person defines, as different NFs based on function types, functions supported in a network. An NF component supports an NF and is configured in a network slice. Component information of each deployed NF component is stored in the local component information base of the NF management device. Because component information of all NF components is stored in the local component information base, the corresponding second NF component identifier may be retrieved from the component information base based on the second NF identifier. The second NF identifier indicates that an NF component has the second NF. There may be a plurality of NF components that have the second NF in an entire network. Therefore, a plurality of second NF components may be determined based on the retrieved second NF component identifier. The processing module extracts the component information of the second NF component after determining the second NF component, and each second NF component has a respective discovery policy. This facilitates centralized NF component management by the NF management device.

With reference to the first implementation of the third aspect of this application, in a second implementation of the third aspect of this application, the NF discovery request further includes an expected network slice identifier, the expected network slice identifier indicates a network slice that is discovered by the first NF component through expected requesting and in which an NF component that has the second NF is located, the component information further includes a network slice identifier of the second NF component, and the network slice identifier of the second NF component indicates a network slice in which the second NF component is located; and the processing module is further configured to obtain the component information of the second NF component from the local component information base based on the second NF identifier and the expected network slice identifier, where the component information of the second NF component includes the second NF component identifier and the network slice identifier.

If the first NF component expectantly discovers and accesses an NF component that has the second NF in a network slice, the NF discovery request sent by the first NF component further needs to include the expected network slice identifier. The NF management device discovers all second NF components, and obtains the component information of the second NF component from the local component information base. Even if the first NF component expectantly discovers and accesses the second NF component in a network slice, the processing module needs to determine a discoverable network slice of the second NF component in the network slice based on the discovery policy. If a network slice in which the first NF component is located is in the discoverable network slice, a requirement of the first NF component is met, and the discovery policy is observed.

With reference to the second implementation of the third aspect of this application, in a third implementation of the third aspect of this application, the discovery policy includes:

the second NF component can be accessed only by an NF component in a same network slice as the second NF component; or the second NF component can be accessed only by an NF component in a specified network slice; or the second NF component can be accessed by NF components in all network slices.

A discovery policy of an NF component is preset according to the network rule. For example, in one case, the second NF component can be accessed only by the NF components in the same network slice based on a network slice isolation requirement. In another case, the second NF component can be accessed by the NF component in the specified network slice. In still another case, the second NF component can be accessed by the NF components in all the network slices without any limitation. The three cases are merely examples for description. There may be another case in actual application, and this is not specifically limited.

With reference to the third implementation of the third aspect of this application, in a fourth implementation of the third aspect of this application, the NF discovery request further includes a network slice identifier of the first NF component;

the processing module is further configured to determine a discoverable network slice of the second NF component based on the discovery policy and the network slice identifier of the second NF component;

the processing module is further configured to determine, based on the network slice identifier of the first NF component, whether a network slice in which the first NF component is located is in the discoverable network slice; and the processing module is further configured to: when the network slice in which the first component is located is in the discoverable network slice, determine that the first NF component can access the second NF component.

If the discovery policy of the second NF component is set based on the network slice isolation requirement, the NF discovery request sent by the first NF component further needs to include the network slice identifier (for example, a slice 1) of the first NF component, or the NF management device may obtain, based on a component identifier of the first NF component and component information of the first NF component stored by the NF management device, the network slice identifier of the network slice in which the first NF component is located. The processing module obtains a discovery policy and a network slice identifier of each second NF component from component information of each second NF component. It is assumed that a discovery policy of a second NF component NF 1 allows only access of NF components in a same network slice, and a network slice identifier is the slice 1; a discovery policy of a second NF component NF 2 allows only access of NF components in a same network slice or a shared network slice (a shared network slice identifier is a slice 3), and a network slice identifier is a slice 2. The NF management device determines, based on the discovery policy and the network slice identifier of the NF 1, that a discoverable network slice of the NF 1 is the slice 1. Likewise, discoverable network slices of the NF 2 are the slice 2 and the slice 3. The processing module determines, based on the network slice identifier (slice 1) of the first NF component, that the network slice in which the first NF component is located is in the discoverable network slice of the NF 1, and determines that the NF 1 is a target NF component. In addition, the processing module determines, based on the network slice identifier (slice 1) of the first NF component, that the network slice in which the first NF component is located is not in the discoverable network slices of the NF 2, determines that the NF 2 is not a target NF component, and determines the target NF component from second NF components that have a same NF based on the discovery policy. In addition, because the discovery policy is set according to the network rule, the determined target NF component certainly complies with the network rule, thereby filtering an NF component that is in the second NF components and whose access by the first NF component does not comply with the network rule.

With reference to the third aspect of this application, in a fifth implementation of the third aspect of this application, the sending module is specifically configured to: generate a component discovery response based on the second NF component identifier, and send the component discovery response to the first NF component.

For the NF discovery request of the first NF component, the NF management device adds the second NF component identifier to the component discovery response, and feeds back the component discovery response to the first NF component. The second NF component identifier may be a component address, a component ID, or the like of the second NF component, and may be an identifier for identifying the second NF component.

With reference to any one of the first to the fifth implementations of the third aspect of this application, in a sixth implementation of the third aspect of this application, the NF management device further includes a storage module;

the storage module is configured to: when a new NF component is deployed, obtain component information of the newly deployed NF component, where the component information of the newly deployed NF component includes a component identifier, an NF identifier, a discovery policy, and a network slice identifier of the newly deployed NF component; and the storage module is further configured to store the component information of the newly deployed NF component in the local component information base.

In the prior art, a skilled person defines, as different NFs based on function types, functions supported in a network. An NF component supports an NF and is configured in a network slice. When the new NF component is deployed, the component information of the newly deployed NF component needs to be sent to the NF management device. The component information includes a component address (for example, an IP address), the component identifier, the NF identifier, the discovery policy, and the network slice identifier of the newly deployed NF component. The component identifier is a unique identifier of the newly deployed NF component. The NF identifier indicates an NF type of the newly deployed NF component. The NF type may identify an authentication and security function component, a bearer management function component, a mobility management function component, an access control function component, and the like. The discovery policy is a discovery condition that is of the newly deployed NF component and that is set by a skilled person according to the network rule. For example, the discovery policy allows only access of NF components in a same network slice, or allows only access of an NF component in a specified network slice. The network slice identifier indicates a network slice in which the newly deployed NF component is located. The NF management device obtains the component information of the newly deployed NF component, and stores the component information in the component information base. To better implement NF component management, the NF management device needs to store component information of newly deployed NF components in all network slices.

A fourth aspect of this application provides an NF management device, and the NF management device has a function of implementing the NF management device in the foregoing method embodiment. The function may be implemented by hardware, or may be implemented by hardware by executing corresponding software. The hardware or the software includes one or more modules corresponding to the function.

In a possible design, the NF management device includes a receiving module, a processing module, and a sending module. The processing module is configured to support the NF management device to execute a corresponding function in the foregoing method. The receiving module and the sending module are configured to support communication between the NF management device and another device.

The receiving module is configured to receive an NF discovery request sent by a first NF component, and the NF discovery request includes a second NF identifier. The processing module is configured to obtain a discovery policy of a second NF based on the second NF identifier. The processing module is further configured to obtain identifiers of one or more second NF components if the discovery policy of the second NF allows the first NF component to access the second NF, and the second NF component has the second NF. The sending module is configured to send the identifiers of the one or more second NF components to the first NF component.

Component information of an NF component configured in a network slice in a core network is stored in the NF management device. If a network service required by a user service initiated by user equipment is processed by the first NF component, in a process of executing a first NF of the first NF component, the first NF component needs to access a component that has the second NF, to execute the second NF. The first NF component adds the second NF identifier to the NF discovery request, and sends the NF discovery request to the NF management device. The receiving module receives the NF discovery request of the first NF component. The processing module obtains the discovery policy of the second NF component based on the second NF identifier in the NF discovery request. If the discovery policy of the second NF allows the first NF component to access the second NF, the processing module obtains the identifiers of the one or more second NF components. The second NF component has the second NF. The sending module sends the identifiers of the one or more second NF components to the first NF component, so that the first NF component can access the second NF component based on the second NF component identifier, and execute the second NF to complete the user service. Because the discovery policy of the second NF component is preset according to a network rule, access of the first NF component to the second NF component complies with the network rule. In comparison with the prior art in which access between NF components may not comply with the network rule, access between all NF components complies with the network rule, thereby facilitating a normal network operation.

With reference to the fourth aspect of this application, in a first implementation of the fourth aspect of this application, the processing module is further configured to obtain component information of the one or more second NF components, where the component information of the second NF component includes the identifier of the second NF component; and the processing module is further configured to obtain the identifiers of the one or more second NF components from the component information of the one or more second NF components.

In the prior art, a skilled person defines, as different NFs based on function types, functions that need to be supported in a network. An NF component can support an NF and is configured in a network slice. Component information of each deployed NF component is stored in a local component information base of the NF management device. The processing module obtains the component information of the one or more second NF components. The component information of the second NF component includes the identifier of the second NF component, so that the identifiers of the one or more second NF components can be obtained from the component information of the one or more second NF components, thereby facilitating centralized NF component management by the NF management device.

With reference to the fourth aspect or the first implementation of the fourth aspect of this application, in a second implementation of the fourth aspect of this application, the NF discovery request further includes an identifier of an expected network slice, and the obtaining a discovery policy of a second NF based on the second NF identifier includes: obtaining the discovery policy of the second NF based on the second NF identifier and the identifier of the expected network slice; and the processing module is further configured to obtain the identifiers of the one or more second NF components in the expected network slice based on the second NF identifier and the identifier of the expected network slice.

If the first NF component expectantly discovers and accesses an NF component that has the second NF in a network slice, the NF discovery request sent by the first NF component further needs to include the identifier of the expected network slice. After the processing module obtains the discovery policy of the second NF based on the second NF identifier and the identifier of the expected network slice, if the discovery policy of the second NF allows the first NF component to access the second NF, the processing module obtains the identifiers of the one or more second NF components in the expected network slice based on the second NF identifier and the identifier of the expected network slice.

With reference to the fourth aspect or the first implementation of the fourth aspect of this application, in a third implementation of the fourth aspect of this application, the NF discovery request further includes an identifier of an NF group, and the obtaining a discovery policy of a second NF based on the second NF identifier includes: obtaining the discovery policy of the second NF based on the second NF identifier and the identifier of the NF group; and the processing module is further configured to obtain the identifiers of the one or more second NF components in the NF group based on the second NF identifier and the identifier of the NF group.

If the first NF component expectantly discovers and accesses an NF component that has the second NF in an NF group, the NF discovery request sent by the first NF component further needs to include the identifier of the NF group. After the processing module obtains the discovery policy of the second NF based on the second NF identifier and the identifier of the NF group, if the discovery policy of the second NF allows the first NF component to access the second NF, the processing module obtains the identifiers of the one or more second NF components in the NF group based on the second NF identifier and the identifier of the NF group.

With reference to the fourth aspect or the first implementation of the fourth aspect of this application, in a fourth implementation of the fourth aspect of this application, the discovery policy of the second NF further includes an identifier of an NF and an identifier of a service that can be accessed by the NF;

the processing module is further configured to: learn, based on the NF discovery request sent by the first NF component, an identifier of an NF of the first NF component; and query the identifier of the NF and the identifier of the service that can be accessed by the NF, to determine an identifier of a service that can be accessed by the first NF component; and the sending module is further configured to send, to the first NF component, the identifier of the service that can be accessed by the first NF component.

With reference to any one of the fourth aspect, or the first to the fourth implementations of the fourth aspect of this application, in a fifth implementation of the fourth aspect of this application, the component information includes a component identifier and an NF identifier.

With reference to the fifth implementation of the fourth aspect of this application, in a sixth implementation of the fourth aspect of this application, the component information may further include at least one of a component address, a network slice identifier, and a group identifier.

With reference to any one of the fourth aspect, or the first to the sixth implementations of the fourth aspect of this application, in a seventh implementation of the fourth aspect of this application, the discovery policy includes:

the second NF can be accessed only by NF components in a same network slice; or the second NF can be accessed only by an NF component in a specified network slice; or the second NF can be accessed by NF components in all network slices.

A fifth aspect of this application provides an NF management device, including:

a wireless network interface, a CPU, and a memory, where the wireless network interface, the CPU, and the memory are connected to each other by using a bus, the memory stores a computer instruction, and the CPU executes the computer instruction to implement the following method:

receiving an NF discovery request sent by a first NF component, where the NF discovery request includes a second NF identifier, and the second NF identifier is used to indicate a second NF;

obtaining component information of a second NF component based on the second NF identifier, where the second NF component has the second NF, and the component information includes a discovery policy of the second NF component and a second NF component identifier;

determining, based on the discovery policy in the component information, whether the first NF component can access the second NF component; and if yes, sending the second NF component identifier to the first NF component.

Because the discovery policy is preset according to a network rule, access of the first NF component to a target NF component complies with the network rule. In comparison with the prior art in which access between NF components may not comply with the network rule, access between all NF components complies with the network rule, thereby facilitating a normal network operation.

A sixth aspect of this application provides an NF management device, including:

a network interface, a processor, and a memory, where the network interfaces, the processor, and the memory are connected to each other by using a bus, the memory stores a computer instruction, and the processor may execute the computer instruction to implement a corresponding function in the foregoing method embodiment. For details, refer to detailed descriptions of the method embodiment. Details are not described again. The NF is used for a wireless network, and the network interface is an interface in a wireless network interface.

A seventh aspect of this application provides an NF management system, including:

an NF management device, a network slice, and an NF component in the network slice, where there is at least one network slice, and there is at least one NF component.

The NF management device receives an NF discovery request sent by a first NF component. The NF discovery request includes a second NF identifier, and the second NF identifier is used to indicate a second NF.

The NF management device obtains component information of a second NF component based on the second NF identifier. The second NF component has the second NF, and the component information includes a discovery policy of the second NF component and a second NF component identifier.

The NF management device determines, based on the discovery policy in the component information, whether the first NF component can access the second NF component.

The NF management device sends the second NF component identifier to the first NF component if the first NF component can access the second NF component.

Component information of each NF component configured in a network slice in a core network is stored in the NF management device. If a network service required by a user service initiated by user equipment is processed by the first NF component, in a process of executing a first NF of the first NF component, the first NF component needs to access a component that has the second NF, to execute the second NF. The first NF component adds the second NF identifier to the NF discovery request, and sends the NF discovery request to the NF management device. The NF management device receives the NF discovery request of the first NF component; obtains the stored component information of the second NF component based on the second NF identifier in the NF discovery request; determines, based on the discovery policy in the component information, whether the first NF component can access the second NF component; and sends the second NF component identifier to the first NF component if the first NF component can access the second NF component, so that the first NF component can access the second NF component based on the second NF component identifier, and execute the second NF to complete the user service. Because the discovery policy is preset according to a network rule, access of the first NF component to the second NF component complies with the network rule. In comparison with the prior art in which access between NF components may not comply with the network rule, access between all NF components complies with the network rule, thereby facilitating a normal network operation.

An eighth aspect of this application provides a communications system.

The system includes the NF management device in the foregoing aspect. The system may further include another device that interacts with the NF management device in the solution provided in embodiments of the present invention.

According to a ninth aspect, an embodiment of the present invention provides a computer storage medium. The computer storage medium is configured to store a computer software instruction used by the foregoing device, and includes a program designed to execute the foregoing aspect.

According to a tenth aspect, this application further provides a computer program product that includes an instruction. When the computer program product runs on a computer, the computer executes the methods in the foregoing aspects.

Component information of an NF component configured in a network slice in a core network is stored in the NF management device. If a network service required by a user service initiated by user equipment is processed by the first NF component, in a process of executing a first NF of the first NF component, the first NF component needs to access a component that has the second NF, to execute the second NF. The first NF component adds the second NF identifier to the NF discovery request, and sends the NF discovery request to the NF management device. The NF management device receives the NF discovery request of the first NF component; obtains the discovery policy of the second NF component based on the second NF identifier in the NF discovery request; obtains the identifiers of the one or more second NF components if the discovery policy of the second NF allows the first NF component to access the second NF, where the second NF component has the second NF; and sends the identifiers of the one or more second NF components to the first NF component, so that the first NF component can access the second NF component based on the second NF component identifier, and execute the second NF to complete the user service. Because the discovery policy of the second NF component is preset according to a network rule, access of the first NF component to the second NF component complies with the network rule. In comparison with the prior art in which access between NF components may not comply with the network rule, access between all NF components complies with the network rule, thereby facilitating a normal network operation.

BRIEF DESCRIPTION OF DRAWINGS

To describe the technical solutions in the embodiments of this application more clearly, the following briefly describes the accompanying drawings required for describing the embodiments and the prior art.

DESCRIPTION OF EMBODIMENTS

This application provides an NF management method and an NF management device, to perform centralized management on discovery and access between NF components, thereby facilitating a normal network operation.

To make a person skilled in the art better understand the technical solutions in this application, the following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

First, a system architecture or a scenario used in this application is briefly described.

Figure 1:
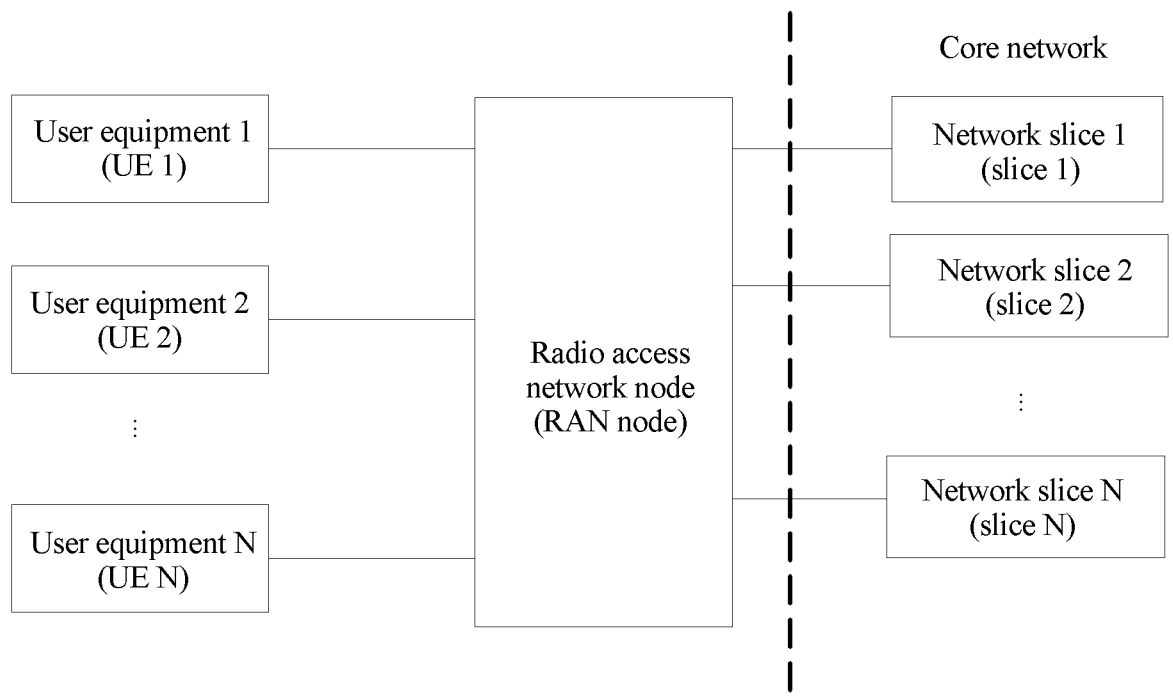
FIG. 1 is a schematic diagram of a network framework of an NF management method in the prior art.
Figure 2:
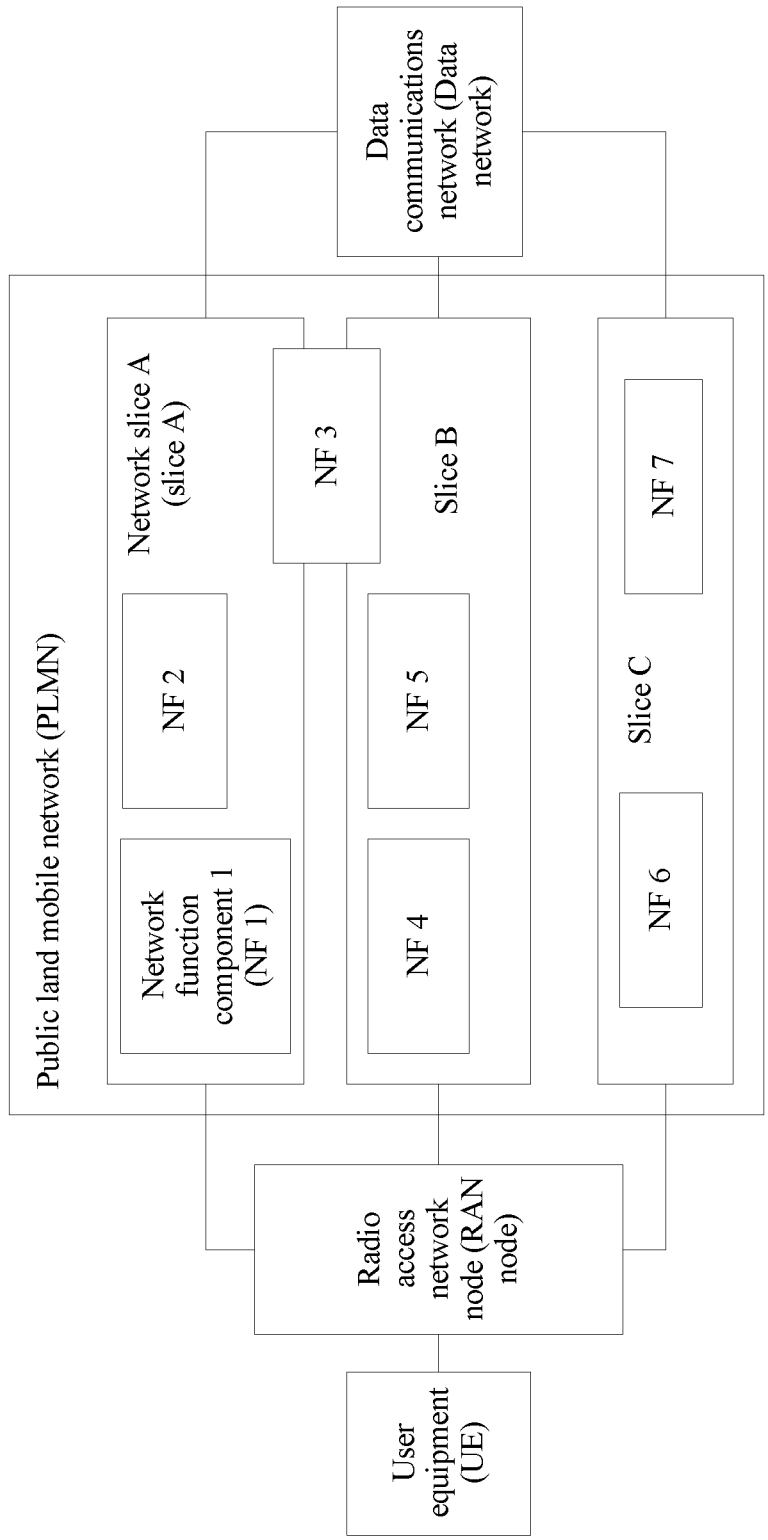
FIG. 2 is a schematic diagram of a network framework of another NF management method in the prior art.

FIG. 2 shows an existing network architecture. A plurality of network slices of a same operator use a same public land mobile network (Public Land Mobile Network, PLMN).

Figure 3:
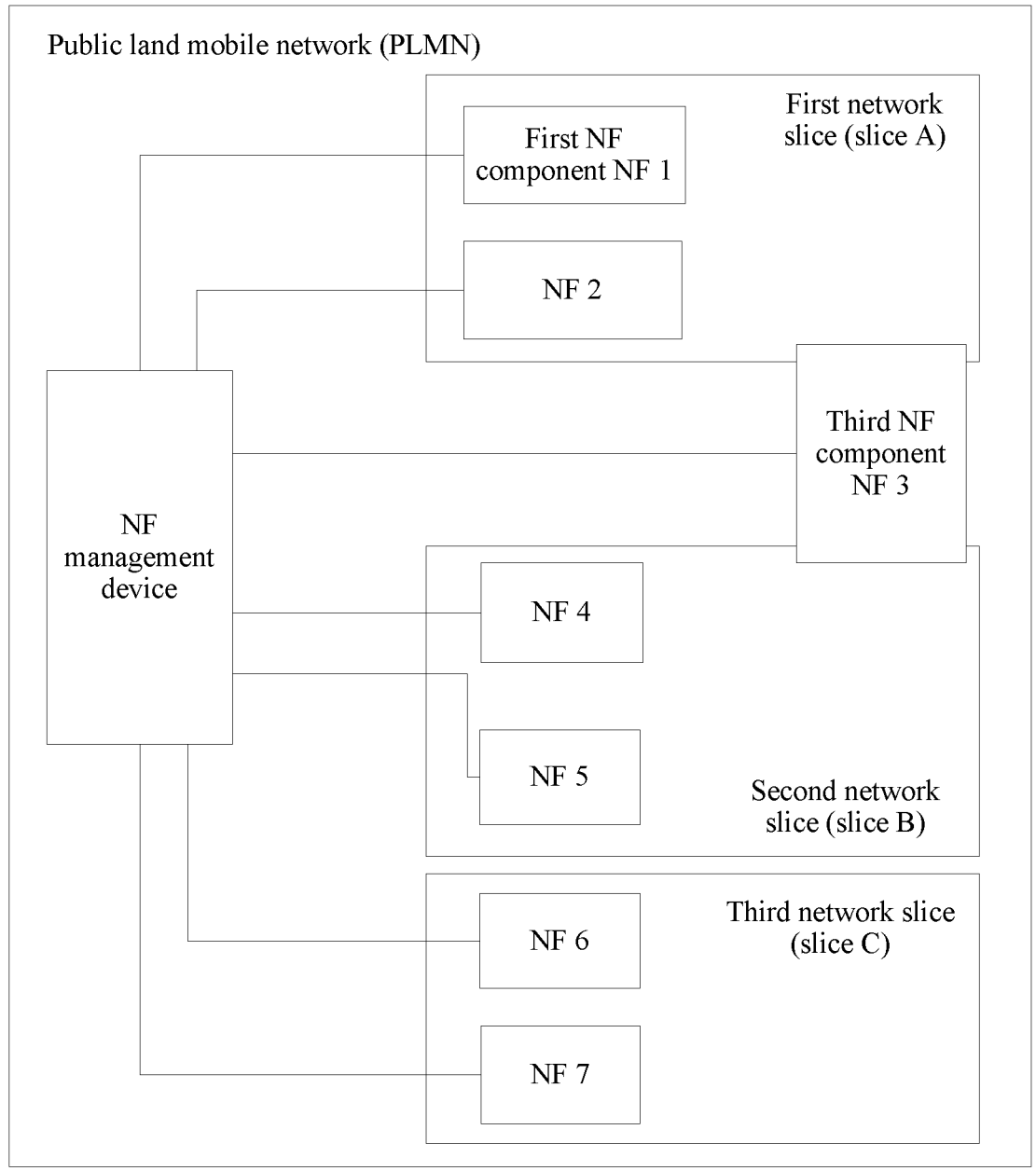
FIG. 3 is a schematic diagram of a network framework of an NF management method according to this application.

Functions that need to be supported in a network are defined as different NFs based on function types. Each NF component deployed in the network has one NF. Each NF component includes a service interface, and serves another NF component or function via the service interface. In this application, an NF management device is added to the PLMN. As shown in FIG. 3, the NF management device is connected to each NF component.

When a skilled person configures an NF component, component information of the NF component needs to be stored in the NF management device. The component information of the NF component generally includes a component address, a component identifier, an NF identifier, a discovery policy, a network slice identifier, and the like. The component address is usually used by another NF component to accurately access the NF component. The component identifier is used to uniquely identify the NF component. For example, the component address, the component ID, or any other identifiers that can be used to identify a second NF component can be used as the component identifier. The NF identifier indicates an NF of the NF component. The discovery policy is a discovery condition that is of the NF component and that is set according to a network rule. The discovery policy allows only access of NF components in a same network slice, access of an NF component in a specified network slice, access of all NF components, or the like. The network slice identifier indicates a network slice in which the NF component is located. If the NF component is shared by a plurality of network slices, the network slice identifier includes identifiers of the plurality of network slices. In addition, if the NF component may not belong to any network slice, the network slice identifier is null. In FIG. 3, a network slice identifier of a first network slice is a slice A, a network slice identifier of a second network slice is a slice B, and a network slice identifier of a third network slice is a slice C. NF 1, NF 2, NF 3, NF 4, NF 5, NF 6, and NF 7 are NF component identifiers. The slice A includes the NF components the NF 1 and the NF 2, the slice B includes the NF 4 and the NF 5, the slice A and the slice B share the NF 3, and the slice C includes the NF 6 and the NF 7. In addition, the NF 3 and the NF 7 have a same NF. It is assumed that the function that NF 1 has is a first NF, and the function that NF 3 has and the function that the NF 7 has are a second NF.

For the discovery policy in the NF component information, NF components that have a same NF may have a same discovery policy. To optimize component information storage, discovery policy information of a plurality of NF components that have a same NF may be stored in separate NF discovery policy information, and the discovery policy information stores the NF and the corresponding discovery policy information.

In addition, NF components that have a same NF and that are deployed in a same network slice may have a same discovery policy. Discovery policy information of a plurality of NF components that have a same NF and that are deployed in a same network slice may be stored in separate NF discovery policy information, and the discovery policy information includes the NF, an identifier of the network slice, and the corresponding discovery policy information.

In another case, NF components that have a same NF and that belong to a same NF group may have a same discovery policy. Discovery policy information of a plurality of NF components that have a same NF and that belong to a same NF group may be stored in separate NF discovery policy information, and the discovery policy information includes the NF, an identifier of the NF group, and the corresponding discovery policy information.

The discovery policy information may be discovery and access conditions that are of the NF and that are set according to the network rule, and specifically includes an identifier of another NF allowed to access the NF. The NF may provide a plurality of services for another NF, and each service of the NF corresponds to a function provided by the NF. To restrict a service of the NF that can be accessed by another NF, the discovery policy information may include the identifier of the another NF, and an identifier of the service that can be accessed by the another NF from the NF.

Figure 8:
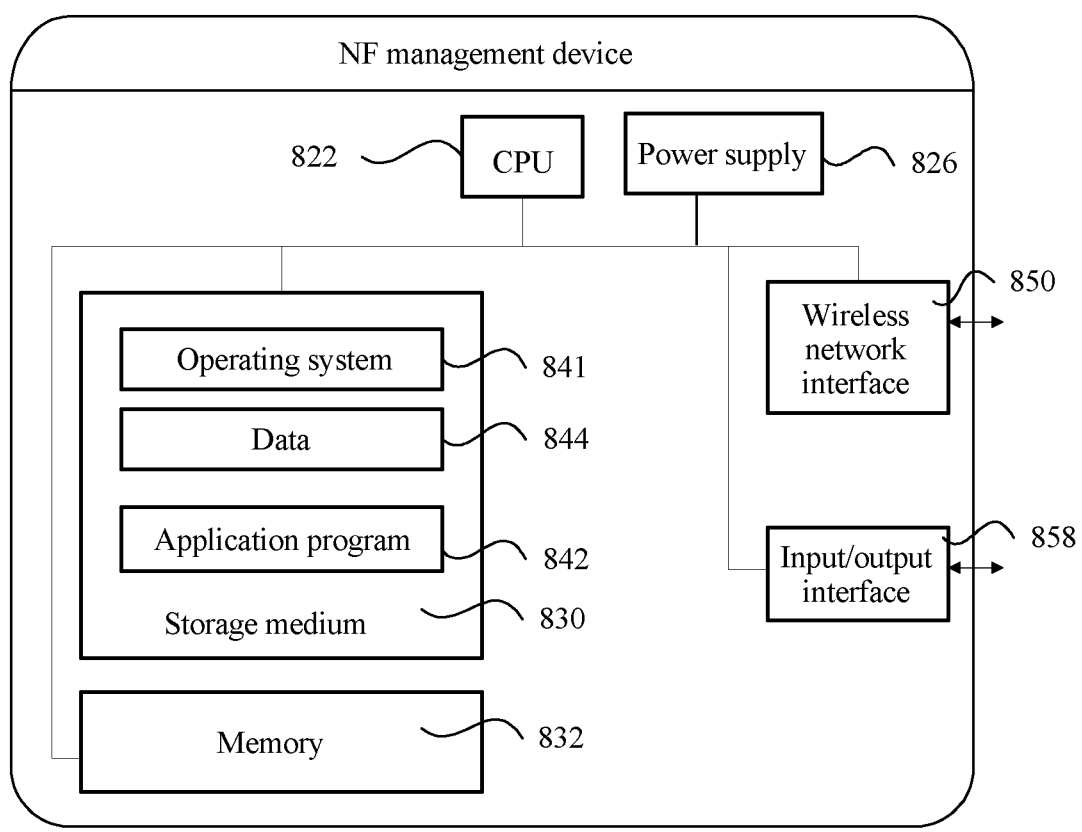
FIG. 8 is a schematic structural diagram of an entity apparatus of an NF management device according to this application.

For example, the NF management device is a server. FIG. 8 is a schematic structural diagram of an NF management device. The NF management device may greatly vary because of different configurations or different performance. The NF management device may include one or more central processing units (central processing unit, CPU) 822 (for example, one or more processors), a memory 832, and one or more storage media 830 (for example, one or more mass storage devices) for storing an application program 842 or data 844. The memory 832 and the storage medium 830 may be transient storage or persistent storage. The program stored in the storage medium 830 may include one or more modules (not shown in the figure), and each module may include a series of instruction operations for the server. Still further, the CPU 822 may be configured to: communicate with the storage medium 830, and perform a series of instruction operations in the storage medium 830 on the server.

The NF management device may further include one or more power supplies 829, one or more wireless network interfaces 850, one or more input/output interfaces 858, and/or one or more operating systems 841, for example, Windows Server™, Mac OS X™, Unix™, Linux™, and FreeBSD™.

Specific details in the foregoing system architecture or scenario are merely an exception. In an actual scenario, a service scope and service content that need to be provided for a user are very extensive, and therefore a divided network slice and a configured NF component are more comprehensive.

The following embodiments describe an NF management method applied to the foregoing system architecture or scenario.

Figure 4:
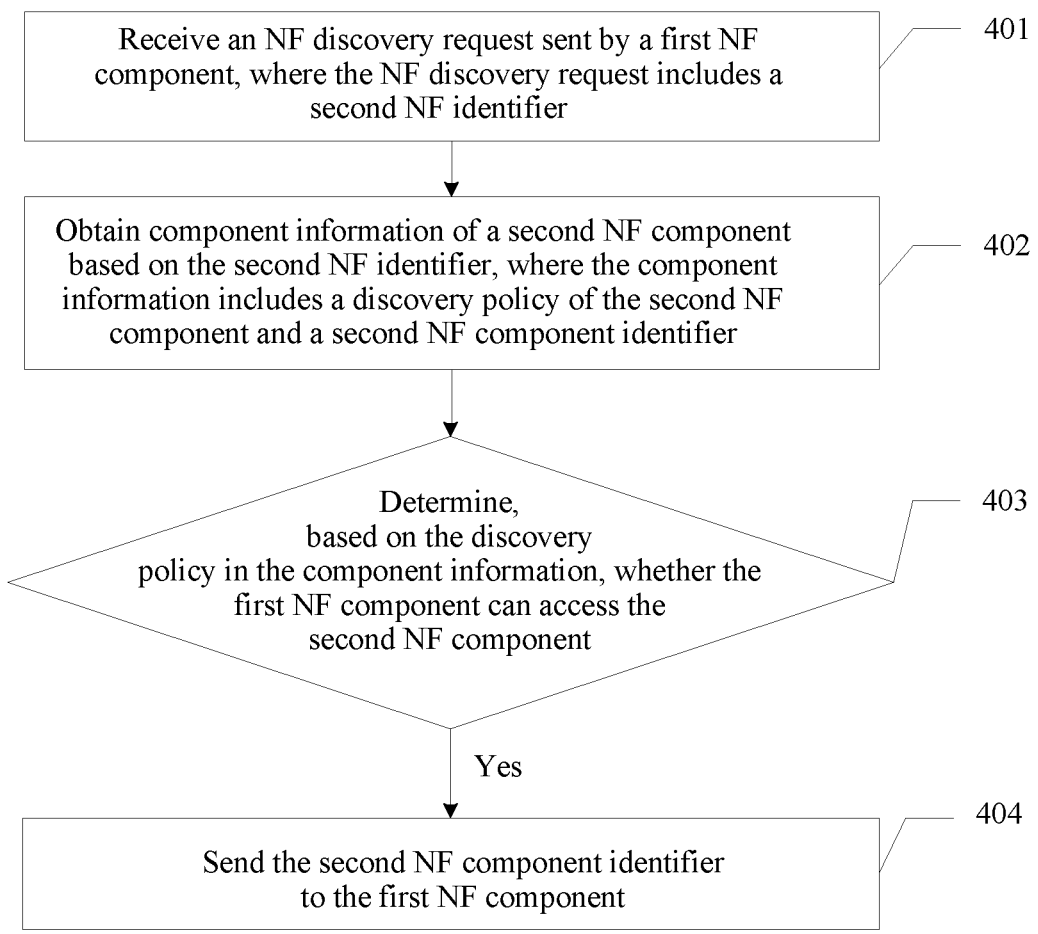
FIG. 4 is a schematic flowchart of an NF management method according to this application.

Referring to FIG. 4, an embodiment of this application provides an NF management method, including the following steps.

401. Receive an NF discovery request sent by a first NF component, where the NF discovery request includes a second NF identifier.

In this embodiment, when a network function required by a user service initiated by user equipment is processed by the first NF component, in a process of executing a first NF of the first NF component, the first NF component needs to access a second NF component to execute a second NF. As shown in FIG. 2, a radio access network node first enables the user equipment to access the first NF component (NF 1) that has the first NF, and the first NF component is deployed in a first network slice (slice A). As shown in FIG. 3, when the NF 1 needs to execute the second NF in the process of executing the first NF, the NF 1 adds the second NF identifier to the NF discovery request, and sends the NF discovery request to an NF management device. The NF discovery request is used to request to discover a component, and the component provides the second NF. In addition, the second NF component may include one or more second NF identifiers indicating the second NF. The NF management device receives the NF discovery request.

The first NF component (NF 1) that has the first NF may be represented by NF_A. NF_A is a type, and indicates that the NF 1 is an NF component that has a function type A.

402. Obtain component information of a second NF component based on the second NF identifier, where the component information includes a discovery policy of the second NF component and a second NF component identifier.

In this embodiment, the NF discovery request includes the second NF identifier, and the NF management device stores component information of each NF component. Therefore, after the NF discovery request is received, component information of one or more second NF components that has the second NF may be obtained based on the second NF identifier in the NF discovery request, for example, component information of an NF 3 and component information of an NF 7. The component information includes the discovery policy and the second NF component identifier. Specifically, the component information may further include an NF identifier. The NF management device may query a local database based on the second NF identifier to obtain component information including the second NF identifier. The discovery policy may be preset by a skilled person according to a network rule during NF component configuration.

403. Determine, based on the discovery policy in the component information, whether the first NF component can access the second NF component, and if yes, perform step 404.

In this embodiment, the discovery policy is preset by a skilled person according to the network rule during NF component configuration. Therefore, after the component information of the NF 3 and the component information of the NF 7 are obtained, based on a discovery policy in the component information of the NF 3 and a discovery policy in the component information of the NF 7, it is determined whether the NF 1 can access the NF 3, and if yes, step 404 is performed; and it is determined whether the NF 1 can access the NF 7, and if yes, step 404 is performed.

404. Send the second NF component identifier to the first NF component.

In this embodiment, when determining that the first NF component can access the second NF component, the NF management device sends the second NF component identifier to the first NF component. There may be one or more second NF component identifiers.

In this embodiment of this application, the NF management device determines, based on the discovery policy, whether the first NF component can access the second NF component. Because the discovery policy is preset according to the network rule, access of the first NF component to the second NF component certainly complies with the network rule. In comparison with the prior art in which access between NF components may not comply with the network rule, access between all NF components complies with the network rule, thereby facilitating a normal network operation.

Optionally, in some embodiments of this application, the NF management method further includes:

when a new NF component is deployed, obtaining component information of the newly deployed NF component, where the component information of the newly deployed NF component includes a component identifier, an NF identifier, a discovery policy, and a network slice identifier of the newly deployed NF component; and storing the component information of the newly deployed NF component in a local component information base.

In this embodiment of this application, in the prior art, a skilled person defines, as different NFs based on function types, functions that need to be supported in a network. An NF component supports an NF and is configured in a network slice. When the new NF component is deployed, the component information of the newly deployed NF component needs to be sent to the NF management device. The component information includes the component identifier, the NF identifier, the discovery policy, and the network slice identifier of the newly deployed NF component. The component identifier is a unique identifier (which may be a component ID or a component address such as an IP address) of the newly deployed NF component. The NF identifier indicates an NF type of the newly deployed NF component. The NF type may identify an authentication and security function, a bearer management function, a mobility management function, an access control function, and the like. The discovery policy is a discovery condition that is of the newly deployed NF component and that is set by a skilled person according to the network rule. For example, the discovery policy allows only access of NF components in a same network slice, or allows only access of an NF component in a specified network slice. The network slice identifier indicates a network slice in which the newly deployed NF component is located. The NF management device obtains the component information of the newly deployed NF component, and stores the component information in the component information base. To better implement NF component management, the NF management device needs to store component information of newly deployed NF components in all network slices.

It should be noted that, if an NF component is shared by a plurality of network slices, the component information includes network slice identifiers of the plurality of network slices sharing the NF component.

Optionally, in some embodiments of this application, the obtaining component information of a second NF component based on the second NF identifier includes:

obtaining the second NF identifier from the NF discovery request; and obtaining the component information of the second NF component from a local component information base based on the second NF identifier, where the component information of the second NF component includes the second NF component identifier.

In this embodiment of this application, the NF discovery request includes the second NF identifier, and the NF management device may parse the NF discovery request to obtain the second NF identifier. Component information of all NF components is stored in the component information base. For example, if a function of the NF component NF 3 is the second NF, the component information of the NF component NF 3 includes a component identifier NF 3 and the second NF identifier. If a function of the NF component NF 7 is the second NF, the component information of the NF component NF 7 includes a component identifier NF 7 and the second NF identifier. The corresponding component identifiers NF 3 and NF 7 may be retrieved from the component information base based on the second NF identifier. In this case, it can be determined, based on the retrieved component identifiers NF 3 and NF 7, that the NF 3 and the NF 7 are second NF components, and the component information of the NF 3 and the component information of the NF 7 are extracted. The component information of the NF 3 includes the discovery policy of the NF 3, and the component information of the NF 7 includes the discovery policy of the NF 7. This facilitates centralized NF component management by the NF management device.

Optionally, in some embodiments of this application, determining a discoverable network slice of the second NF component based on the discovery policy and a network slice identifier of the second NF component includes:

selecting a target network slice identifier from the network slice identifier of the second NF component based on an expected network slice identifier; and determining, based on the discovery policy and the target network slice identifier, the discoverable network slice of the second NF component in a target network slice corresponding to the target network slice identifier.

In this embodiment of this application, in FIG. 3 if the first NF component (NF 1) needs to access the second NF component (NF 7) in a second network slice to execute the second NF, the NF discovery request further needs to carry a network slice identifier (slice B) of the second network slice, and the network slice identifier (slice B) of the second network slice is the expected network slice identifier. In addition, it can be learned from step 503 that network slice identifiers of the second NF component (NF 3) are the slice A and the slice B, and a network slice identifier of the NF 7 is a slice C. In this case, the slice B is selected as the target network slice identifier, the second network slice corresponding to the slice B includes the second NF component NF 3, and the discovery policy of the NF 3 allows only access of NF components in the first network slice and the second network slice. Therefore, it is determined, based on the discovery policy of the NF 3 and the target network slice identifier (slice B), that the discoverable network slice is the second network slice. If the expected network slice identifier is the slice C, the determined target network slice identifier is the slice C. However, based on the discovery policy of the NF 7, an NF component in the first network slice in which the NF 1 is located cannot access the NF 7 in a third network slice, and therefore there is no discoverable network slice. For directional discovery and access requests of the first NF component, the NF management device needs to perform filtering based on the discovery policy, to better standardize NF management.

In the foregoing embodiment, the NF management device discovers, based on the second NF identifier in the NF discovery request sent by the first NF component, all network slices including the second NF component. In another case, the first NF component expectantly requests to discover a second NF component in a determined network slice. To be specific, the NF discovery request further includes the expected network slice identifier. Optionally, in some embodiments of this application, the NF discovery request further includes the expected network slice identifier, and the expected network slice identifier indicates a network slice that is discovered by the first NF component through expected requesting and in which an NF component that has the second NF is located. The component information further includes the network slice identifier of the second NF component, and the network slice identifier of the second NF component indicates a network slice in which the second NF component is located.

The obtaining the component information of the second NF component from a local component information base based on the second NF identifier includes:

obtaining the component information of the second NF component from the local component information base based on the second NF identifier and the expected network slice identifier, where the component information of the second NF component includes the second NF component identifier and the network slice identifier.

In this embodiment of this application, in FIG. 3 if the first NF component (NF 1) needs to access the second NF component (NF 7) in a second network slice to execute the second NF, the NF discovery request further needs to carry a network slice identifier (slice B) of the second network slice, and the network slice identifier (slice B) of the second network slice is the expected network slice identifier. In addition, it can be learned from step 503 that network slice identifiers of the second NF component (NF 3) are the slice A and the slice B, and a network slice identifier of the NF 7 is a slice C. In this case, the slice B is selected as the target network slice identifier, the second network slice corresponding to the slice B includes the second NF component NF 3, and a discovery policy of the NF 3 allows only access of NF components in the first network slice and the second network slice. Therefore, it is determined, based on the discovery policy of the NF 3 and the target network slice identifier (slice B), that the discoverable network slice is the second network slice. If the expected network slice identifier is the slice C, the determined target network slice identifier is the slice C. However, based on a discovery policy of the NF 7, an NF component in the first network slice in which the NF 1 is located cannot access the NF 7 in a third network slice, and therefore there is no discoverable network slice. For directional discovery and access requests of the first NF component, the NF management device needs to perform filtering based on the discovery policy, to better standardize NF management.

In the foregoing embodiment, the discovery policy is preset according to the network rule, and the discovery policy is not described in detail. In the following description, the discovery policy is set based on a network slice isolation requirement of an operator. Optionally, in some embodiments of this application, the discovery policy includes:

the second NF component can be accessed only by an NF component in a same network slice as the second NF component; or the second NF component can be accessed only by an NF component in a specified network slice; or the second NF component can be accessed by NF components in all network slices.

In this embodiment of this application, a discovery policy of an NF component is preset according to the network rule. For example, in one case, the second NF component can be accessed only by the NF components in the same network slice based on the network slice isolation requirement. In another case, the second NF component can be accessed by the NF component in the specified network slice. In still another case, the second NF component can be accessed by the NF components in all the network slices without any limitation. The three cases are merely examples for description. There may be another case in actual application, and this is not specifically limited.

Figure 5:
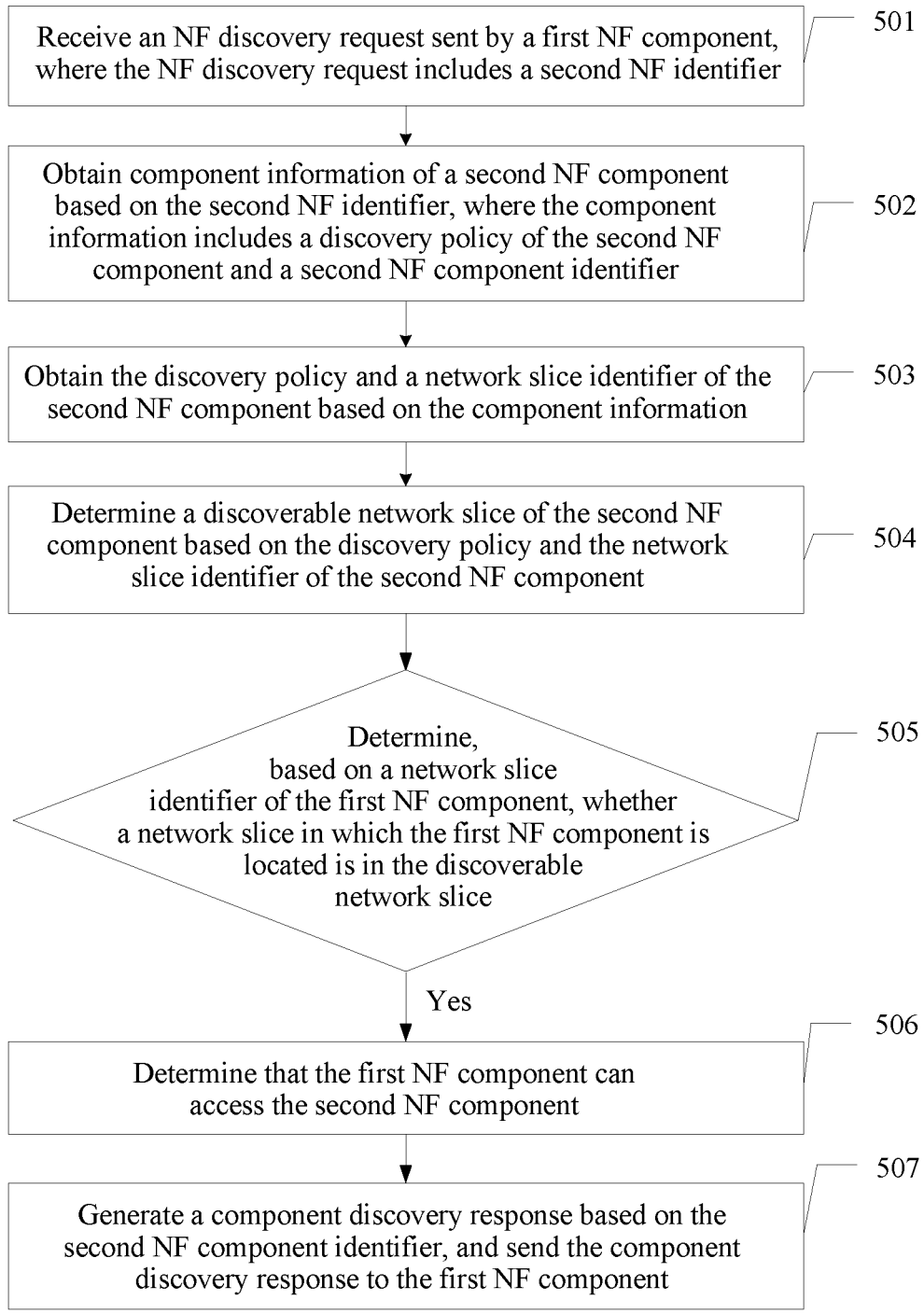
FIG. 5 is another schematic flowchart of an NF management method according to this application.

In the foregoing embodiment, the discovery policy is set based on the network slice isolation requirement of the operator, and therefore the NF discovery request further needs to include a network slice identifier of the first NF component. Referring to FIG. 5, an embodiment of this application provides an NF management method, including the following steps.

501. Receive an NF discovery request sent by a first NF component, where the NF discovery request includes a second NF identifier.

For details, refer to step 401.

502. Obtain component information of a second NF component based on the second NF identifier, where the component information includes a discovery policy of the second NF component and a second NF component identifier.

For details, refer to step 402.

503. Obtain the discovery policy and a network slice identifier of the second NF component based on the component information.

In this embodiment, after component information of an NF 3 and component information of an NF 7 are obtained, a discovery policy and a network slice identifier of the NF 3 and a discovery policy and a network slice identifier of the NF 7 may be obtained from the component information. The NF 3 is shared by a first network slice and a second network slice, and the discovery policy is set based on a network slice isolation requirement of an operator. If the discovery policy of the NF 3 allows only access of NF components in the first network slice and the second network slice, network slice identifiers of the NF 3 are a slice A and a slice B, and if a discovery policy of the NF 7 allows only access of an NF component in a third network slice, a network slice identifier of the NF 7 is a slice C.

504. Determine a discoverable network slice of the second NF component based on the discovery policy and the network slice identifier of the second NF component.

In this embodiment, it is determined, based on the network slice identifiers (slice A and slice B) and the discovery policy of the NF 3, that discoverable network slices of the NF 3 are the first network slice and the second network slice. To be specific, only access of the NF components in the first network slice and the second network slice to the NF 3 meets the network slice isolation requirement of the operator. It is determined, based on the discovery policy and the network slice identifier (slice C) of the NF 7, that a discoverable network slice of the NF 7 is the third network slice. To be specific, only access of the NF component in the third network slice to the NF 7 meets the network slice isolation requirement of the operator.

505. Determine, based on a network slice identifier of the first NF component, whether a network slice in which the first NF component is located is in the discoverable network slice, and if yes, perform step 506.

In this embodiment, the NF discovery request sent by the first NF component (NF 1) includes the network slice identifier (slice A) of the NF 1. It can be learned, based on the slice A, that the NF 1 is in the first network slice. Because the discoverable network slices of the NF 3 are the first network slice and the second network slice, the first network slice in which the NF 1 is located is in the discoverable network slices of the NF 3, and step 506 is performed. Because the discoverable network slice of the NF 7 is the third network slice, the first network slice in which the NF 1 is located is not in the discoverable network slice of the NF 7, and step 506 is not performed.

In another possible implementation, the NF discovery request sent by the first NF component (NF 1) includes a component identifier of the first NF component. Component information of the first NF component is obtained from a component information base based on the component identifier of the first NF component, and the component information includes the network slice identifier (slice A) of the first NF component.

506. Determine that the first NF component can access the second NF component.

In this embodiment, if the first network slice in which the NF 1 is located is in the discoverable network slices of the NF 3, it is determined that the NF 1 can access the NF 3.

507. Generate a component discovery response based on the second NF component identifier, and send the component discovery response to the first NF component.

In this embodiment, after it is determined that the NF 1 can access the NF 3, a second NF component identifier such as an IP address or an ID of the NF 3 is obtained from the component information of the NF 3. A component discovery response is generated based on the second NF component identifier of the NF 3, and the component discovery response is fed back to the first NF component (NF 1) sending the NF discovery request. After receiving the component discovery response, the NF 1 accesses the NF 3 based on the second NF component identifier of the NF 3 in the component discovery response, and the NF 3 provides a second NF by using a service interface, to complete a user service.

In this embodiment of this application, because the discovery policy is set based on the network slice isolation requirement of the operator, access of the NF 1 to the NF 3 certainly meets the network slice isolation requirement, but access of the NF 1 to the NF 7 does not meet the network slice isolation requirement. Therefore, a network address and other information of the NF 7 are not discovered by the NF 1. It can be learned that a target NF component determined based on the discovery policy certainly complies with a network rule, thereby ensuring a normal network operation.

Figure 9:
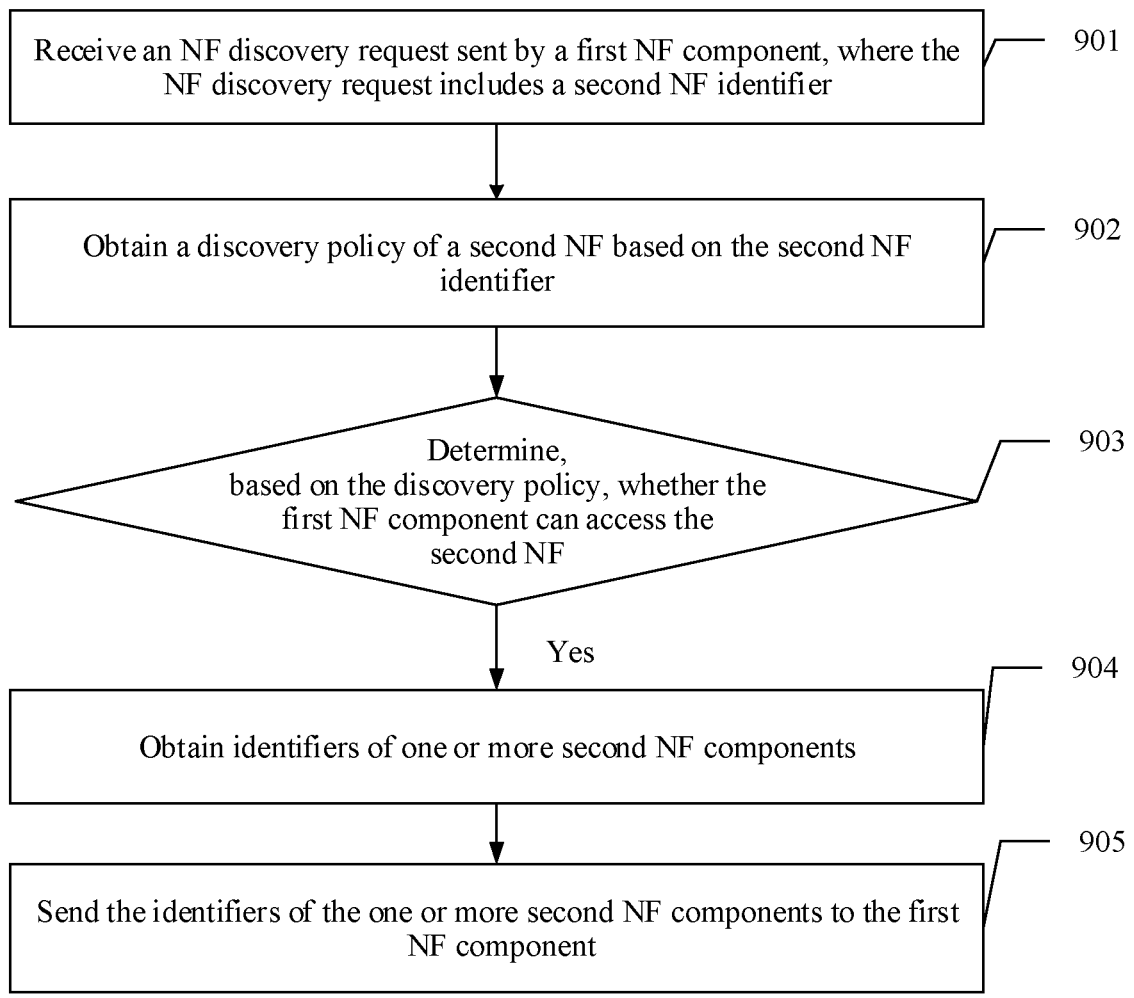
FIG. 9 is still another schematic flowchart of an NF management method according to this application.

In the foregoing embodiment, all NF discovery policies are included in component information. If there is separate NF discovery policy information, as shown in FIG. 9, this application provides an NF management method, including the following steps.

901. Receive an NF discovery request sent by a first NF component, where the NF discovery request includes a second NF identifier.

In this embodiment, the NF discovery request is used to request to discover an NF component of an NF type. Specifically, for example, the NF discovery request may be a discovery request.

Optionally, when the first NF component expects to discover a second NF deployed in a network slice, the NF discovery request includes an identifier of an expected network slice; when the first NF component expects to discover a second NF in an NF group, the NF discovery request includes an identifier of an NF group; or when the first NF component expects to obtain one or more specified services from a second NF, the NF discovery request includes an identifier of a service of the second NF that expects to be accessed. Therefore, in addition to the second NF identifier, the NF discovery request may include the identifier of the expected network slice and/or the identifier of the NF group.

902. Obtain a discovery policy of a second NF based on the second NF identifier.

In this embodiment, the NF discovery request includes the second NF identifier, and an NF management device stores a discovery policy corresponding to each NF. Therefore, after the NF discovery request is received, discovery policy information of the second NF may be obtained based on the second NF identifier in the NF discovery request, and the discovery policy may be preset by a skilled person according to a network rule during NF component configuration.

When discovery policy information of a plurality of NF components that have a same NF and that are deployed in a same network slice may be stored in separate NF discovery policy information, discovery policy information of a second NF deployed in the expected network slice is determined based on the second NF identifier and the identifier of the expected network slice in the NF discovery request.

When discovery policy information of a plurality of NF components that have a same NF and that belong to a same NF group may be stored in separate NF discovery policy information, discovery policy information of a second NF belonging to the NF group is determined based on the second NF identifier and the identifier of the NF group in the NF discovery request.

903. Determine, based on the discovery policy of the second NF, whether the first NF component can access the second NF, and if yes, perform step 904.

For details, refer to step 403 in the embodiment shown in FIG. 4. If the first NF component can access the second NF, step 904 is performed. Further, the discovery policy information of the second NF includes an identifier of an NF and an identifier of a service that can be accessed by the NF (that is, a service from the second NF that can be accessed by an NF of a type). An identifier of an NF of the first NF component may be learned based on the NF discovery request sent by the first NF component. The identifier of the NF and the identifier of the service that can be accessed by the NF are queried to determine an identifier of a service that can be accessed by the first NF component.

Specifically, obtaining the identifier of the NF of the first NF component based on the NF discovery request sent by the first NF component specifically includes the following manner: information about the first NF component stored by the NF management device includes the identifier of the NF of the first NF component, and the NF management device determines the information about the first NF component after receiving the NF discovery request sent by the first NF component in step 901, so as to obtain the identifier of the NF of the first NF component; or the NF discovery request sent by the first NF component in step 901 includes the identifier of the NF of the first NF component, so that the NF management device obtains the identifier of the NF of the first NF component.

904. Obtain identifiers of one or more second NF components.

Specifically, the NF management device may obtain the identifier of the second NF component that has the second NF based on the second NF identifier in the NF discovery request and component information of all NF components included in a component information base stored by the NF management device. There may be a plurality of second NF components. For example, both components NF 3 and NF 7 have the second NF, and therefore identifiers of the components NF 3 and NF 7 are the identifier of the second NF component.

905. Send the identifiers of the one or more second NF components to the first NF component.

Further, an identifier of a service that can be accessed by the second NF is provided for the first NF component.

In this embodiment of this application, the NF management device receives the NF discovery request of the first NF component; obtains the discovery policy of the second NF component based on the second NF identifier in the NF discovery request; if the discovery policy of the second NF allows the first NF component to access the second NF, obtains the identifiers of the one or more second NF components, where the second NF component has the second NF; and sends the identifiers of the one or more second NF components to the first NF component, so that the first NF component can access the second NF component based on the second NF component identifier, and execute the second NF to complete a user service. Because the discovery policy of the second NF component is preset according to a network rule, access of the first NF component to the second NF component complies with the network rule. In comparison with the prior art in which access between NF components may not comply with the network rule, access between all NF components complies with the network rule, thereby facilitating a normal network operation.

The foregoing embodiment describes the NF management method in this application, and the following describes an apparatus embodiment in detail.

Figure 6:
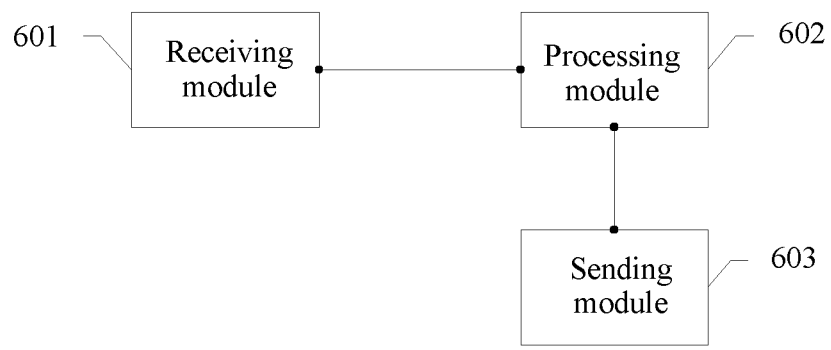
FIG. 6 is a schematic structural diagram of an NF management device according to this application.

Referring to FIG. 6, an embodiment of this application provides an NF management device, including a receiving module 601, a processing module 602, and a sending module 603.

The receiving module 601 is configured to receive an NF discovery request sent by a first NF component. The NF discovery request includes a second NF identifier, and the second NF identifier is used to indicate a second NF.

For details, refer to step 401.

The processing module 602 is configured to obtain component information of a second NF component based on the second NF identifier. The second NF component has the second NF, and the component information includes a discovery policy of the second NF component and a second NF component identifier.

For details, refer to step 402.

The processing module 602 is further configured to determine, based on the discovery policy in the component information, whether the first NF component can access the second NF component.

For details, refer to step 403.

The sending module 603 is configured to send the second NF component identifier to the first NF component when the first NF component can access the second NF component.

For details, refer to step 404.

In this embodiment of this application, component information of each NF component configured in a network slice in a core network is stored in the NF management device. If a network service required by a user service initiated by user equipment is processed by the first NF component, in a process of executing a first NF of the first NF component, the first NF component needs to access a component that has the second NF, to execute the second NF. The first NF component adds the second NF identifier to the NF discovery request, and sends the NF discovery request to the NF management device. The receiving module 601 receives the NF discovery request of the first NF component. The processing module 602 obtains the stored component information of the second NF component based on the second NF identifier in the NF discovery request, and determines, based on the discovery policy in the component information, whether the first NF component can access the second NF component. The sending module 603 sends the second NF component identifier to the first NF component if the first NF component can access the second NF component, so that the first NF component can access the second NF component based on the second NF component identifier, and execute the second NF to complete the user service. Because the discovery policy is preset according to a network rule, access of the first NF component to the second NF component complies with the network rule. In comparison with the prior art in which access between NF components may not comply with the network rule, access between all NF components complies with the network rule, thereby facilitating a normal network operation.

Optionally, in some embodiments of this application, the processing module 602 is further configured to obtain the second NF identifier from the NF discovery request.

The processing module 602 is further configured to obtain the component information of the second NF component from a local component information base based on the second NF identifier. The component information of the second NF component includes the discovery policy and the second NF component identifier.

In this embodiment of this application, in the prior art, a skilled person defines, as different NFs based on function types, functions supported in a network. An NF component supports an NF and is configured in a network slice. Component information of each deployed NF component is stored in the local component information base of the NF management device. Because component information of all NF components is stored in the local component information base, the corresponding second NF component identifier may be retrieved from the component information base based on the second NF identifier. The second NF identifier indicates that an NF component has the second NF. There may be a plurality of NF components that have the second NF in an entire network. Therefore, a plurality of second NF components may be determined based on the retrieved second NF component identifier. The processing module 602 extracts the component information of the second NF component after determining the second NF component, and each second NF component has a respective discovery policy. This facilitates centralized NF component management by the NF management device.

Optionally, in some embodiments of this application, the NF discovery request further includes an expected network slice identifier, the expected network slice identifier indicates a network slice that is discovered by the first NF component through expected requesting and in which an NF component that has the second NF is located, the component information further includes a network slice identifier of the second NF component, and the network slice identifier of the second NF component indicates a network slice in which the second NF component is located.

The processing module 602 is further configured to obtain the component information of the second NF component from the local component information base based on the second NF identifier and the expected network slice identifier. The component information of the second NF component includes the second NF component identifier and the network slice identifier.

In this embodiment of this application, if the first NF component expectantly discovers and accesses an NF component that has the second NF in a network slice, the NF discovery request sent by the first NF component further needs to include the expected network slice identifier. The processing module 602 discovers all second NF components, and obtains the component information of the second NF component from the local component information base. Even if the first NF component expectantly discovers and accesses the second NF component in a network slice, the NF management device needs to determine a discoverable network slice of the second NF component in the network slice based on the discovery policy. If a network slice in which the first NF component is located is in the discoverable network slice, a requirement of the first NF component is met, and the discovery policy is observed.

Optionally, in some embodiments of this application, the NF discovery request further includes a network slice identifier of the first NF component.

The processing module 602 is further configured to determine a discoverable network slice of the second NF component based on the discovery policy and the network slice identifier of the second NF component.

For details, refer to step 504.

The processing module 602 is further configured to determine, based on the network slice identifier of the first NF component, whether a network slice in which the first NF component is located is in the discoverable network slice.

For details, refer to step 505.

The processing module 602 is further configured to: when the network slice in which the first component is located is in the discoverable network slice, determine that the first NF component can access the second NF component.

For details, refer to step 506.

In this embodiment of this application, if the discovery policy of the second NF component is set based on a network slice isolation requirement, the NF discovery request sent by the first NF component further needs to include the network slice identifier (for example, a slice 1) of the first NF component, or the NF management device may obtain, based on a component identifier of the first NF component and component information of the first NF component stored by the NF management device, the network slice identifier of the network slice in which the first NF component is located. The processing module 602 obtains a discovery policy and a network slice identifier of each second NF component from component information of each second NF component. It is assumed that a discovery policy of a second NF component NF 1 allows only access of NF components in a same network slice, and a network slice identifier is the slice 1; a discovery policy of a second NF component NF 2 allows only access of NF components in a same network slice or a shared network slice (a shared network slice identifier is a slice 3), and a network slice identifier is a slice 2. The processing module 602 determines, based on the discovery policy and the network slice identifier of the NF 1, that a discoverable network slice of the NF 1 is the slice 1. Likewise, discoverable network slices of the NF 2 are the slice 2 and the slice 3. The processing module 602 determines, based on the network slice identifier (slice 1) of the first NF component, that the network slice in which the first NF component is located is in the discoverable network slice of the NF 1, and determines that the NF 1 is a target NF component. In addition, the processing module 602 determines, based on the network slice identifier (slice 1) of the first NF component, that the network slice in which the first NF component is located is not in the discoverable network slices of the NF 2, determines that the NF 2 is not a target NF component, and determines the target NF component from second NF components that have a same NF based on the discovery policy. In addition, because the discovery policy is set according to the network rule, the determined target NF component certainly complies with the network rule, thereby filtering an NF component that is in the second NF components and whose access by the first NF component does not comply with the network rule.

Optionally, in some embodiments of this application, the sending module 603 is specifically configured to: generate a component discovery response based on the second NF component identifier, and send the component discovery response to the first NF component.

For details, refer to step 507.

In this embodiment of this application, after the processing module 602 determines the target NF component, the sending module 603 adds the second NF component identifier to the component discovery response for the NF discovery request of the first NF component, and feeds back the component discovery response to the first NF component. The second NF component identifier may be a component address, a component ID, or the like of the second NF component, and may be an identifier for identifying the second NF component.

Figure 7:
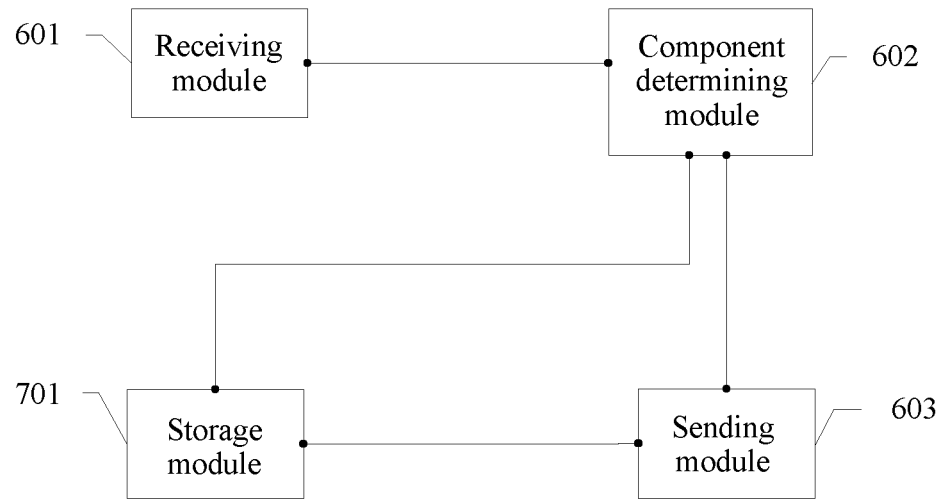
FIG. 7 is another schematic structural diagram of an NF management device according to this application.

Optionally, as shown in FIG. 7, in some embodiments of this application, the NF management device further includes a storage module 701.

The storage module 701 is configured to: when a new NF component is deployed, obtain component information of the newly deployed NF component. The component information of the newly deployed NF component includes a component identifier, an NF identifier, a discovery policy, and a network slice identifier of the newly deployed NF component.

The storage module 701 is further configured to store the component information of the newly deployed NF component in the local component information base.

In this embodiment of this application, in the prior art, a skilled person defines network functions as different NFs based on function types. An NF component supports an NF and is configured in a network slice. When the new NF component is deployed, the component information of the newly deployed NF component needs to be sent to the NF management device. The component information includes a component address (for example, an IP address), the component identifier, the NF identifier, the discovery policy, and the network slice identifier of the newly deployed NF component. The component identifier is a unique identifier of the newly deployed NF component. The NF identifier indicates an NF of the newly deployed NF component. The discovery policy is a discovery condition that is of the newly deployed NF component and that is set by a skilled person according to the network rule. For example, the discovery policy allows only access of NF components in a same network slice, or allows only access of an NF component in a specified network slice. The network slice identifier indicates a network slice in which the newly deployed NF component is located. The storage module 701 obtains the component information of the newly deployed NF component, and stores the component information in the component information base. To better implement NF component management, the NF management device needs to store component information of newly deployed NF components in all network slices.

Based on the method embodiment shown in FIG. 9, referring to FIG. 6, another NF management device provided in an embodiment of this application is configured to implement a function of the NF management device in FIG. 9, and includes a receiving module 601, a processing module 602, and a sending module 603.

The receiving module 601 is configured to receive an NF discovery request sent by a first NF component. The NF discovery request includes a second NF identifier.

The processing module 602 is configured to obtain a discovery policy of a second NF based on the second NF identifier.

The processing module 602 is further configured to obtain identifiers of one or more second NF components if the discovery policy of the second NF allows the first NF component to access the second NF. The second NF component has the second NF.

The sending module 603 is configured to send the identifiers of the one or more second NF components to the first NF component.

In this embodiment of this application, component information of each NF component configured in a network slice in a core network is stored in the NF management device. If a network service required by a user service initiated by user equipment is processed by the first NF component, in a process of executing a first NF of the first NF component, the first NF component needs to access a component that has the second NF, to execute the second NF. The first NF component adds the second NF identifier to the NF discovery request, and sends the NF discovery request to the NF management device. The receiving module 601 receives the NF discovery request of the first NF component. The processing module 602 obtains the discovery policy of the second NF component based on the second NF identifier in the NF discovery request. If the discovery policy of the second NF allows the first NF component to access the second NF, the processing module 602 obtains the identifiers of the one or more second NF components. The second NF component has the second NF. The sending module 603 sends the identifiers of the one or more second NF components to the first NF component, so that the first NF component can access the second NF component based on the second NF component identifier, and execute the second NF to complete the user service. Because the discovery policy of the second NF component is preset according to a network rule, access of the first NF component to the second NF component complies with the network rule. In comparison with the prior art in which access between NF components may not comply with the network rule, access between all NF components complies with the network rule, thereby facilitating a normal network operation.

Optionally, in some embodiments of this application, the processing module 602 is further configured to obtain component information of the one or more second NF components, where the component information of the second NF component includes the identifier of the second NF component; and the processing module 602 is further configured to obtain the identifiers of the one or more second NF components from the component information of the one or more second NF components.

In this embodiment of this application, in the prior art, a skilled person defines, as different NFs based on function types, functions that need to be supported in a network. An NF component can support an NF and is configured in a network slice. Component information of each deployed NF component is stored in the local component information base of the NF management device. The processing module 602 obtains the component information of the one or more second NF components. The component information of the second NF component includes the identifier of the second NF component, so that the identifiers of the one or more second NF components can be obtained from the component information of the one or more second NF components, thereby facilitating centralized NF component management by the NF management device.

Optionally, in some embodiments of this application, the NF discovery request further includes an identifier of an expected network slice, and the obtaining a discovery policy of a second NF based on the second NF identifier includes: obtaining the discovery policy of the second NF based on the second NF identifier and the identifier of the expected network slice.

The processing module 602 is further configured to obtain the identifiers of the one or more second NF components in the expected network slice based on the second NF identifier and the identifier of the expected network slice.

In this embodiment of this application, if the first NF component expectantly discovers and accesses an NF component that has the second NF in a network slice, the NF discovery request sent by the first NF component further includes the identifier of the expected network slice. After the processing module 602 obtains the discovery policy of the second NF based on the second NF identifier and the identifier of the expected network slice, if the discovery policy of the second NF allows the first NF component to access the second NF, the processing module obtains the identifiers of the one or more second NF components in the expected network slice based on the second NF identifier and the identifier of the expected network slice.

Optionally, in some embodiments of this application, the NF discovery request further includes an identifier of an NF group, and the obtaining a discovery policy of a second NF based on the second NF identifier includes: obtaining the discovery policy of the second NF based on the second NF identifier and the identifier of the NF group.

The processing module 602 is further configured to obtain the identifiers of the one or more second NF components in the NF group based on the second NF identifier and the identifier of the NF group.

In this embodiment of this application, if the first NF component expectantly discovers and accesses an NF component that has the second NF in an NF group, the NF discovery request sent by the first NF component further needs to include the identifier of the NF group. After the processing module 602 obtains the discovery policy of the second NF based on the second NF identifier and the identifier of the NF group, if the discovery policy of the second NF allows the first NF component to access the second NF, the processing module obtains the identifiers of the one or more second NF components in the NF group based on the second NF identifier and the identifier of the NF group.

Optionally, in some embodiments of this application, the discovery policy of the second NF further includes an identifier of an NF and an identifier of a service that can be accessed by the NF. The processing module 602 is further configured to: learn, based on the NF discovery request sent by the first NF component, an identifier of an NF of the first NF component; and query the identifier of the NF and the identifier of the service that can be accessed by the NF, to determine an identifier of a service that can be accessed by the first NF component. The sending module 603 is further configured to send, to the first NF component, the identifier of the service that can be accessed by the first NF component.

Optionally, in some embodiments of this application, the component information includes a component identifier and an NF identifier.

Optionally, in some embodiments of this application, the component information may further include at least one of a component address, a network slice identifier, and a group identifier.

An embodiment of a modular structure of an NF management device is described above. The following describes an entity apparatus of an NF management device by using an example in which the NF management device is a server.

Referring to FIG. 8, an embodiment of this application provides an NF management device, including:

a wireless network interface 850, a CPU 822, and a memory 832, where the wireless network interface 850, the CPU 822, and the memory 803 are connected to each other by using a bus, the memory 832 stores a computer instruction, and the CPU 822 executes the computer instruction to implement the following method:

receiving an NF discovery request sent by a first NF component, where the NF discovery request includes a second NF identifier, and the second NF identifier is used to indicate a second NF;

obtaining component information of a second NF component based on the second NF identifier, where the second NF component has the second NF, and the component information includes a discovery policy of the second NF component and a second NF component identifier;

determining, based on the discovery policy in the component information, whether the first NF component can access the second NF component; and if yes, sending the second NF component identifier to the first NF component.

The memory 832 may store component information of an NF component, and the wireless network interface 850 is connected to each NF component.

Based on the embodiment in FIG. 9, referring to FIG. 8, FIG. 8 is a possible schematic structural diagram of another NF management device according to an embodiment of this application, and the NF management device includes:

a network interface 850 (the network interface is an interface in a wireless network interface), a processor 822, and a memory 832, where the network interface 850, the processor 822, and the memory 803 are connected to each other by using a bus, the memory 832 stores a computer instruction, and the processor 822 executes the computer instruction to implement the method in FIG. 9. For example, the method may include the following steps:

receiving an NF discovery request sent by a first NF component, where the NF discovery request includes a second NF identifier;

obtaining a discovery policy of a second NF based on the second NF identifier;

obtaining identifiers of one or more second NF components if the discovery policy of the second NF allows the first NF component to access the second NF, where the second NF component has the second NF; and sending the identifiers of the one or more second NF components to the first NF component.

Method or algorithm steps described in combination with the content disclosed in the present invention may be implemented by hardware, or may be implemented by a processor by executing a software instruction. The software instruction may include a corresponding software module. The software module may be stored in a random access memory (Random Access Memory, RAM), a flash memory, a read-only memory (Read-Only Memory, ROM), an erasable programmable read only memory (Erasable Programmable ROM, EPROM), an electrically erasable programmable read only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present invention may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to preferred embodiments, and the involved actions and modules are not necessarily required by this application.

A person of ordinary skill in the art may understand that all or a part of the steps of the methods in the embodiments may be implemented by a program instructing relevant hardware. The program may be stored in a computer readable storage medium. The storage medium may include a ROM, a RAM, a magnetic disk, or an optical disc.

The NF management method and the NF management device provided in the embodiments of this application are described in detail above. The principle and implementation of this application are described herein by using specific examples in this specification. The description of the embodiments is only provided to help understand the method and core ideas of this application. In addition, a person of ordinary skill in the art can make variations and modifications to this application in terms of the specific implementations and application scopes based on the ideas of this application. Therefore, the content of this specification shall not be construed as a limit to the application.

The invention claimed is:

1. A network function (NF) management method, comprising:

sending, by a first NF component, an NF discovery request to a NF management device, wherein the NF discovery request comprises a NF type, first network slice information indicating an expected network slice, and second network slice information indicating a first network slice of the first NF component;

receiving, by the NF management device, the NF discovery request;

sending, by the NF management device, component information of a second NF component, wherein the second NF component supports the NF type and is located in a network slice indicated by the first network slice information, and the component information of the second NF component comprises a discovery policy of the second NF component, and an identifier of the second NF component, wherein the second NF component is allowed to be accessed by NF components in the first network slice indicated by the second network slice information; and receiving, by the first NF component, the component information of the second NF component.

2. The method according to claim 1, wherein the method further comprises:

obtaining, by the NF management device, the component information of the second NF component from a local component information base based on the NF identifier and the first network slice information.

3. The method according to claim 1, wherein the step of sending component information of a second NF component comprises:
sending, by the NF management device, a component discovery response to the first NF component, wherein the component discovery response comprises the component information of the second NF component; and
wherein the step of receiving the component information of the second NF component by the first NF component comprises:
receiving, by the first NF component, the component discovery response.

4. A network function (NF) management system, comprising:
a first NF component; and
an NF management device,
wherein the first NF component is configured to send an NF discovery request to the NF management device, wherein the NF discovery request comprises a NF type, first network slice information indicating an expected network slice, and second network slice information indicating a first network slice of the first NF component;
wherein the NF management device is configured to:
receive the NF discovery request;
send component information of a second NF component, wherein the second NF component supports the NF type and is located in a network slice indicated by the first network slice information, and the component information of the second NF component comprises a discovery policy of the second NF component, and an identifier of the second NF component, wherein the second NF component is allowed to be accessed by NF components in the first network slice indicated by the second network slice information; and
wherein the first NF component is further configured to receive the component information the second NF component.

5. The system according to claim 4, wherein the NF management device is further configured to:
obtain the component information of the second NF component from a local component information base based on the NF identifier and the first network slice information.

6. The system according to claim 4, wherein the NF management device is further configured to:
send a component discovery response to the first NF component, wherein the component discovery response comprises the component information of the second NF component;
the first NF component is further configured to receive the component discovery response.

7. A method performed by a network function (NF) management device, comprising:
receiving an NF discovery request from a first NF component, wherein the NF discovery request comprises a NF type, first network slice information indicating an expected network slice, and second network slice information indicating a first network slice of the first NF component;
send component information of a second NF component, wherein the second NF component supports the second NF type and is located in a network slice indicated by the first network slice information, and the component information of the second NF component comprises a discovery policy of the second NF component and an identifier of the second NF component, wherein the second NF component is allowed to be accessed by NF components in the first network slice indicated by the second network slice information.

8. The method according to claim 7, wherein the method further comprises:
obtaining the component information of the second NF component from a local component information base based on the NF identifier and the first network slice information.

9. The method according to claim 7, wherein the step of sending component information of a secon NF component comprises:
sending a component discovery response to the first NF component, wherein the component discovery response comprises the component information of the second NF component.

10. The method according to claim 7, further comprising:
when a new NF component is deployed, obtaining component information of the newly deployed NF component, wherein the component information of the newly deployed NF component comprises a component identifier, an NF identifier, a discovery policy, and a network slice identifier of the newly deployed NF component; and
storing the component information of the newly deployed NF component in the local component information base.

11. A network function (NF) management device, comprising:
a transceiver for sending and receiving network communications;
a memory storing executable instructions;
a processor configured to execute the executable instructions to:
receive an NF discovery request from a first NF component, wherein the NF discovery request comprises a NF type, first network slice information indicating an expected network slice, and second network slice information indicating a first network slice of the first NF component;
send component information of a second NF component, wherein the second NF component supports the second NF type and is located in a network slice identified by the first network slice information, and the component information of the second NF component comprises a discovery policy of the second NF component and an identifier of the second NF component, wherein the second NF component is allowed to be accessed by NF components in the first network slice indicated by the second network slice information.

12. The device according to claim 11, wherein the processor is further configured to
obtain the component information of the second NF component from a local component information base based on the NF identifier and the first network slice information.

13. The method according to claim 11, wherein the processor is further configured to:
sending a component discovery response to the first NF component, wherein the component discovery response comprises the component information of the second NF component.

14. A non-transitory computer readable storage medium storing one or more programs comprising instructions that when executed by a processor of a network function (NF) management device, cause the NF management device to perform operations of:
- receiving an NF discovery request from a first NF component, wherein the NF discovery request comprises a NF type, first network slice information indicating an expected network slice, and second network slice information indicating a first network slice of the first NF component;
- sending component information of a second NF component, wherein the second NF component supports the second NF type and is located in a network slice indicated by the first network slice information, and the component information of the second NF component comprises a discovery policy of the second NF component and an identifier of the second NF component, wherein the second NF component is allowed to be accessed by NF components in the first network slice indicated by the second network slice information.

15. The non-transitory computer readable storage medium according to claim 14, wherein the instructions further cause the device to perform operations of:
- obtaining the component information of the second NF component from a local component information base based on the NF identifier and the first network slice information.

16. The non-transitory computer readable storage medium according to claim 14, wherein the instructions further cause the device to perform operations of:
- sending a component discovery response to the first NF component, wherein the component discovery response comprises the component information of the second NF component.

17. The non-transitory computer readable storage medium according to claim 14, wherein the instructions further cause the NF management device to perform operations of:
- when a new NF component is deployed, obtaining component information of the newly deployed NF component, wherein the component information of the newly deployed NF component comprises a component identifier, an NF identifier, a discovery policy, and a network slice identifier of the newly deployed NF component; and
- storing the component information of the newly deployed NF component in the local component information base.

* * * * *